(12) United States Patent
Kim et al.

(10) Patent No.: US 10,744,638 B2
(45) Date of Patent: Aug. 18, 2020

(54) ROBOT ARM

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Yong Jae Kim, Cheonan-si (KR); Hyeong Seok Jeon, Cheongju-si (KR); Yong Jun Jeong, Cheongju-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 15/558,199

(22) PCT Filed: Mar. 14, 2016

(86) PCT No.: PCT/KR2016/002517
§ 371 (c)(1),
(2) Date: Sep. 18, 2017

(87) PCT Pub. No.: WO2016/148463
PCT Pub. Date: Sep. 22, 2016

(65) Prior Publication Data
US 2018/0065243 A1    Mar. 8, 2018

(30) Foreign Application Priority Data

Mar. 17, 2015 (KR) .......................... 10-2015-0036884
Mar. 17, 2015 (KR) .......................... 10-2015-0036886
Apr. 7, 2015 (KR) .......................... 10-2015-0048796

(51) Int. Cl.
*B25J 9/00* (2006.01)
*B25J 17/02* (2006.01)
*B25J 9/10* (2006.01)

(52) U.S. Cl.
CPC ............. *B25J 9/104* (2013.01); *B25J 9/0024* (2013.01); *B25J 9/105* (2013.01); *B25J 17/0241* (2013.01)

(58) Field of Classification Search
CPC ....... B25J 9/06; B25J 9/10; B25J 9/104; B25J 9/106; B25J 17/00; B25J 17/0241; B25J 17/025; Y10S 901/15; Y10S 901/28
(Continued)

(56) References Cited

U.S. PATENT DOCUMENTS 7,101,363 B2 * 9/2006 Nishizawa ........... A61B 17/062 606/1
7,316,681 B2 * 1/2008 Madhani .......... A61B 17/00234 606/1

(Continued)

FOREIGN PATENT DOCUMENTS

JP 2006-247804 A 9/2006
KR 10-0637956 B1 10/2006
(Continued)

*Primary Examiner* — Bobby Rushing, Jr.
(74) *Attorney, Agent, or Firm* — Patent Office of Dr. Chung Park

(57) ABSTRACT

A robot arm according to the present invention includes: a shoulder joint assembly which is connected to an upper arm portion, and includes a drive unit for generating driving power; an elbow joint assembly which is provided between the upper arm portion and a forearm portion, and operates by being supplied with driving power from the drive unit; and a wrist joint assembly which is provided between the forearm portion and a hand portion, and operates by being supplied with driving power from the drive unit.

5 Claims, 30 Drawing Sheets

(58) Field of Classification Search
USPC .......................................... 74/490.04, 490.05
See application file for complete search history.

(56) References Cited

U.S. PATENT DOCUMENTS

| | | | | |
|---|---|---|---|---|
| 7,398,707 | B2* | 7/2008 | Morley | A61B 17/062 |
| | | | | 74/490.06 |
| 8,052,185 | B2* | 11/2011 | Madhani | B25J 15/0009 |
| | | | | 294/106 |
| 8,297,672 | B2* | 10/2012 | Kim | B25J 9/104 |
| | | | | 294/106 |
| 9,486,919 | B1* | 11/2016 | Thorne | B25J 9/1633 |
| 2014/0257331 | A1* | 9/2014 | Kim | A61B 34/71 |
| | | | | 606/130 |
| 2014/0331798 | A1* | 11/2014 | Shim | B25J 9/104 |
| | | | | 74/89.22 |

FOREIGN PATENT DOCUMENTS

| | | |
|---|---|---|
| KR | 10-0997140 B1 | 11/2010 |
| KR | 10-2010-0131338 A | 12/2010 |
| KR | 10-1289985 B1 | 7/2013 |
| KR | 10-2014-0131231 A | 11/2014 |

* cited by examiner

[FIG.1]
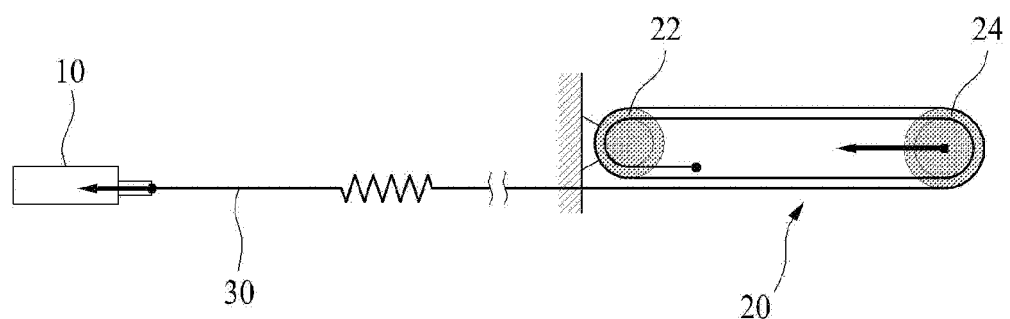

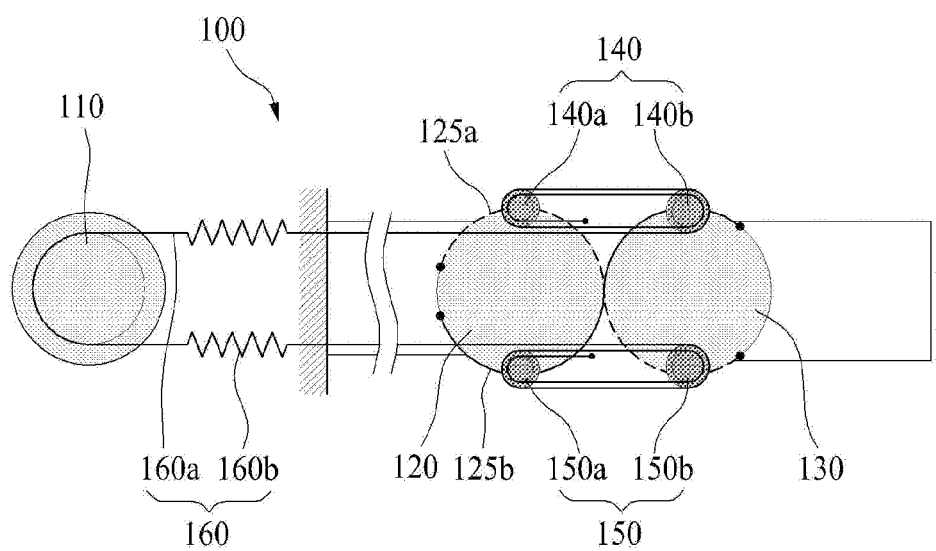
[FIG.2]

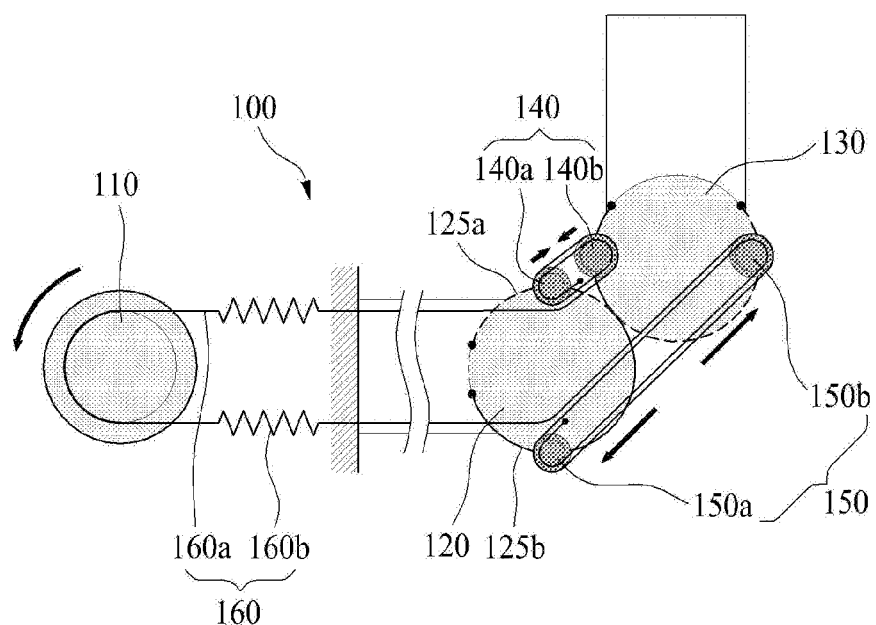
[FIG. 3]

[FIG. 4]
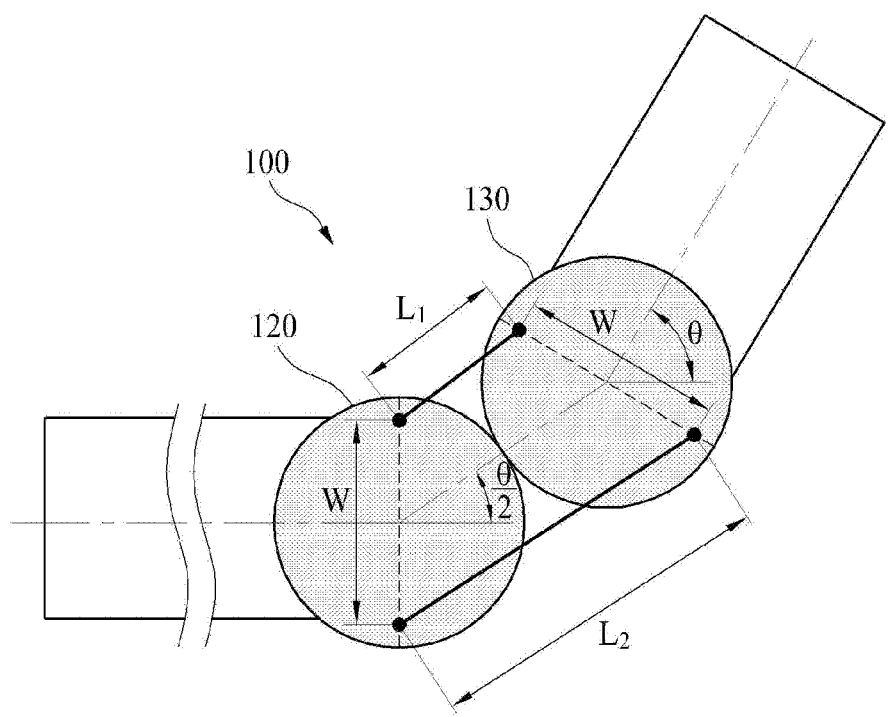

[FIG. 5]
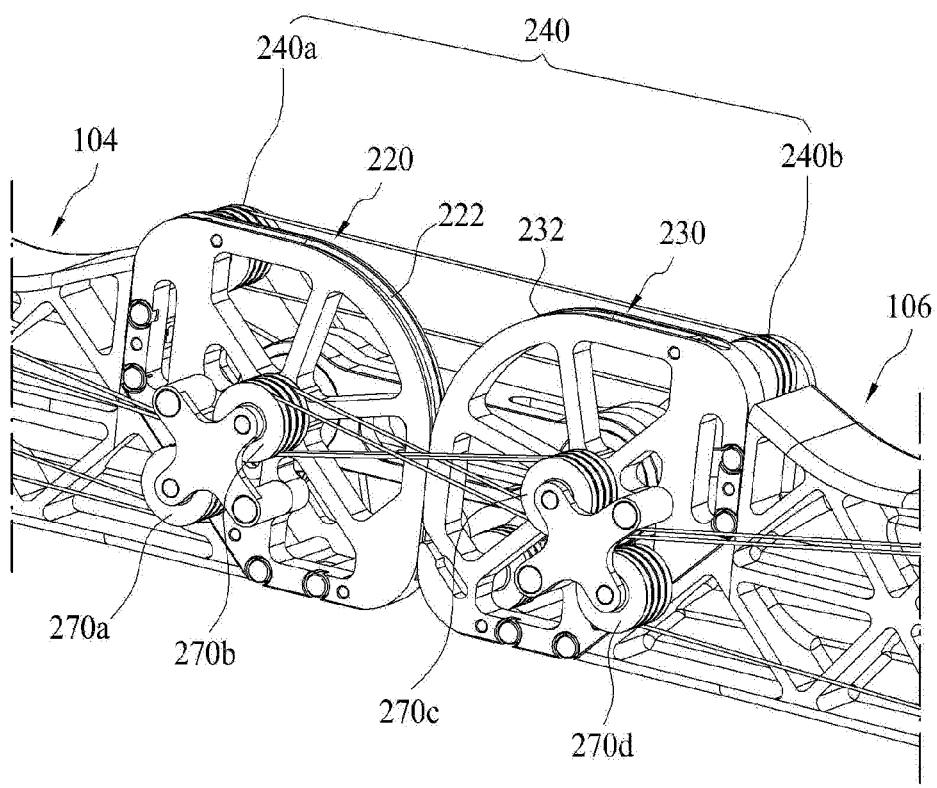

【FIG. 6】
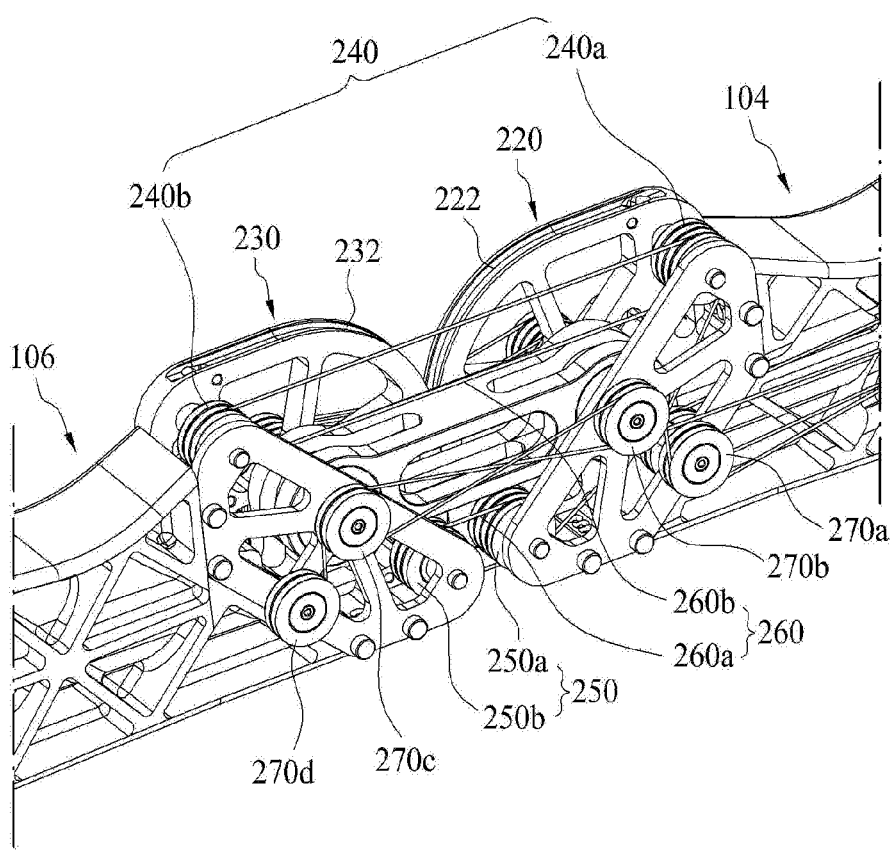

[FIG. 7]
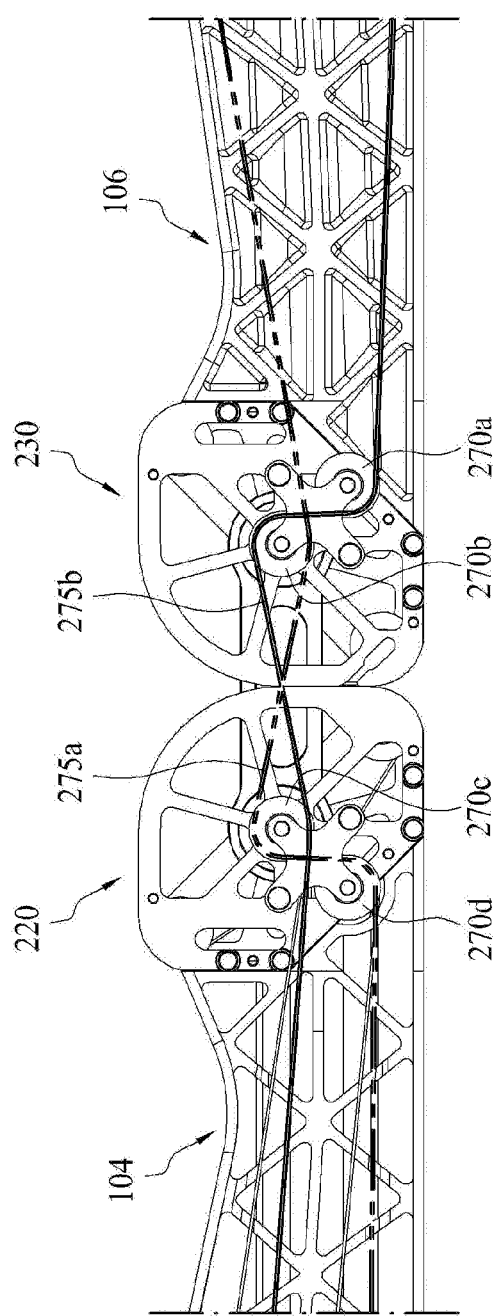

[FIG. 8]
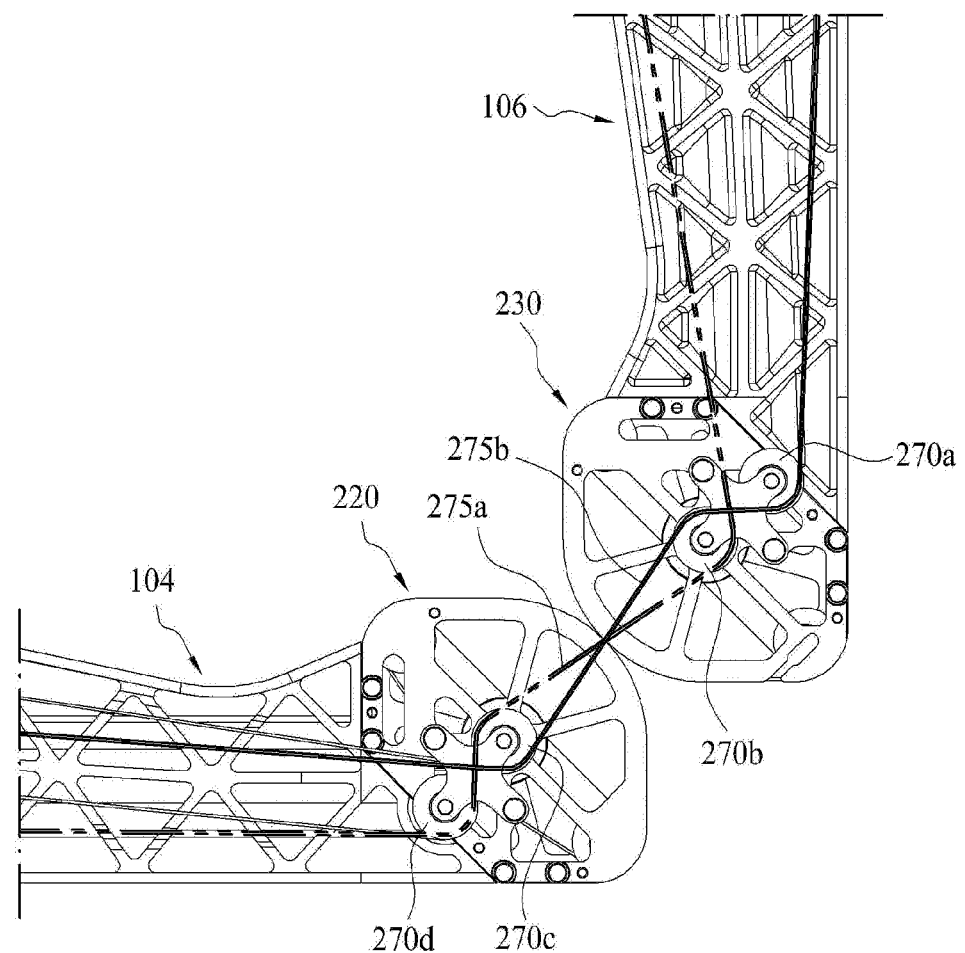

[FIG. 9]
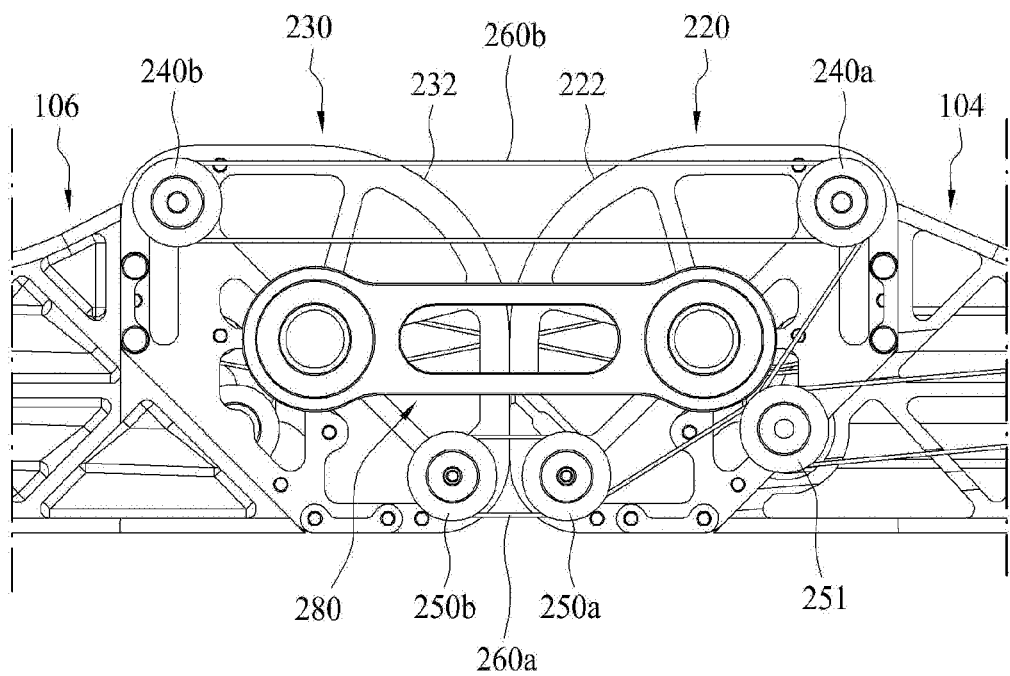

[FIG. 10]
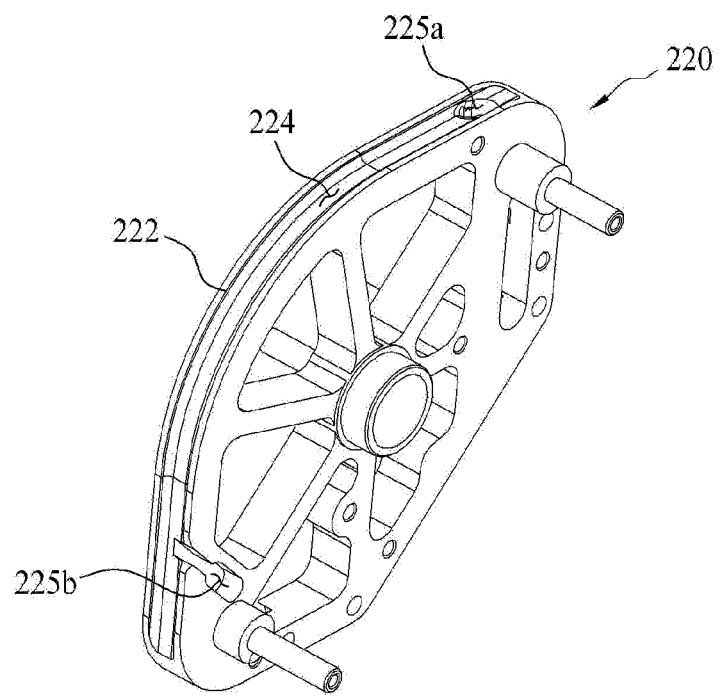

[FIG. 11]
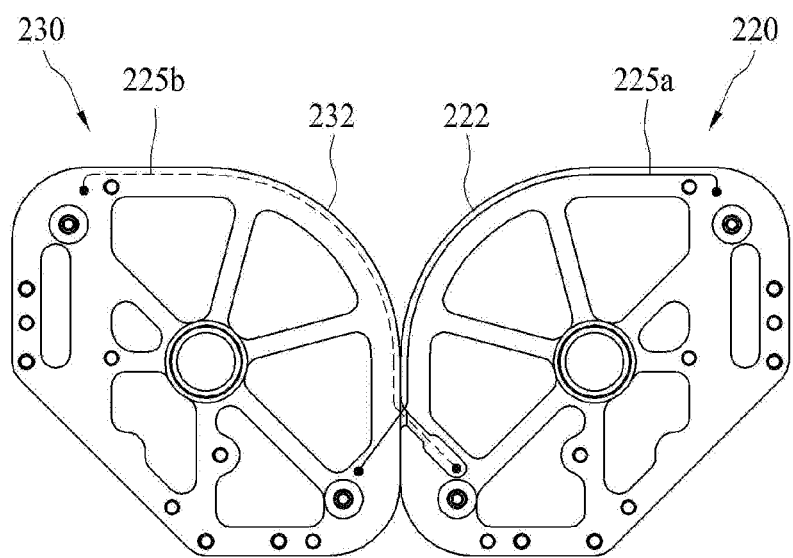

[FIG. 12]
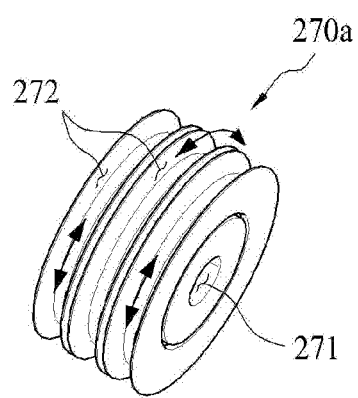

[FIG. 13]
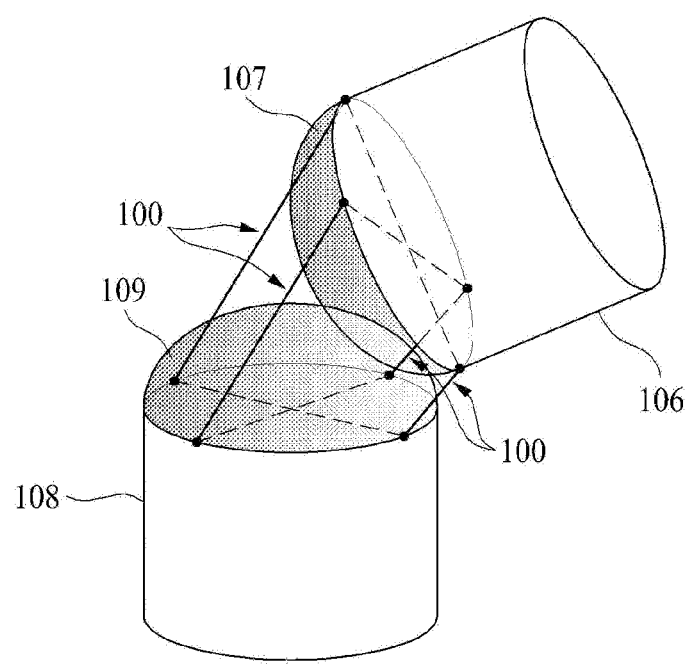

【FIG. 14】
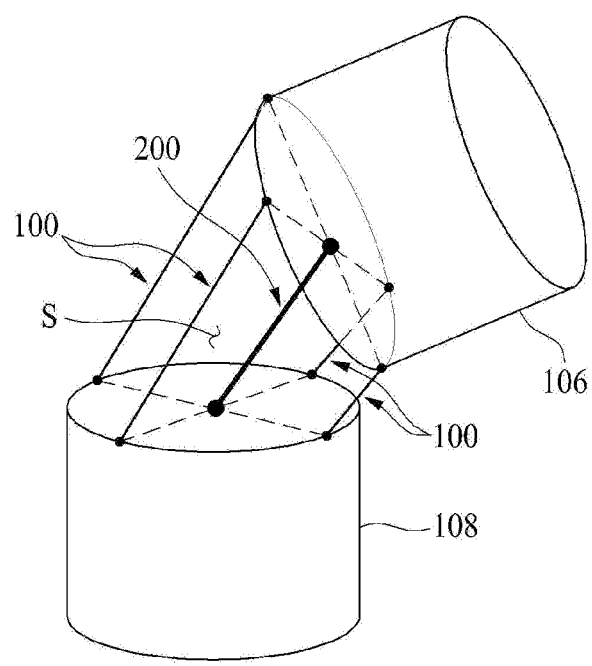

【FIG. 15】
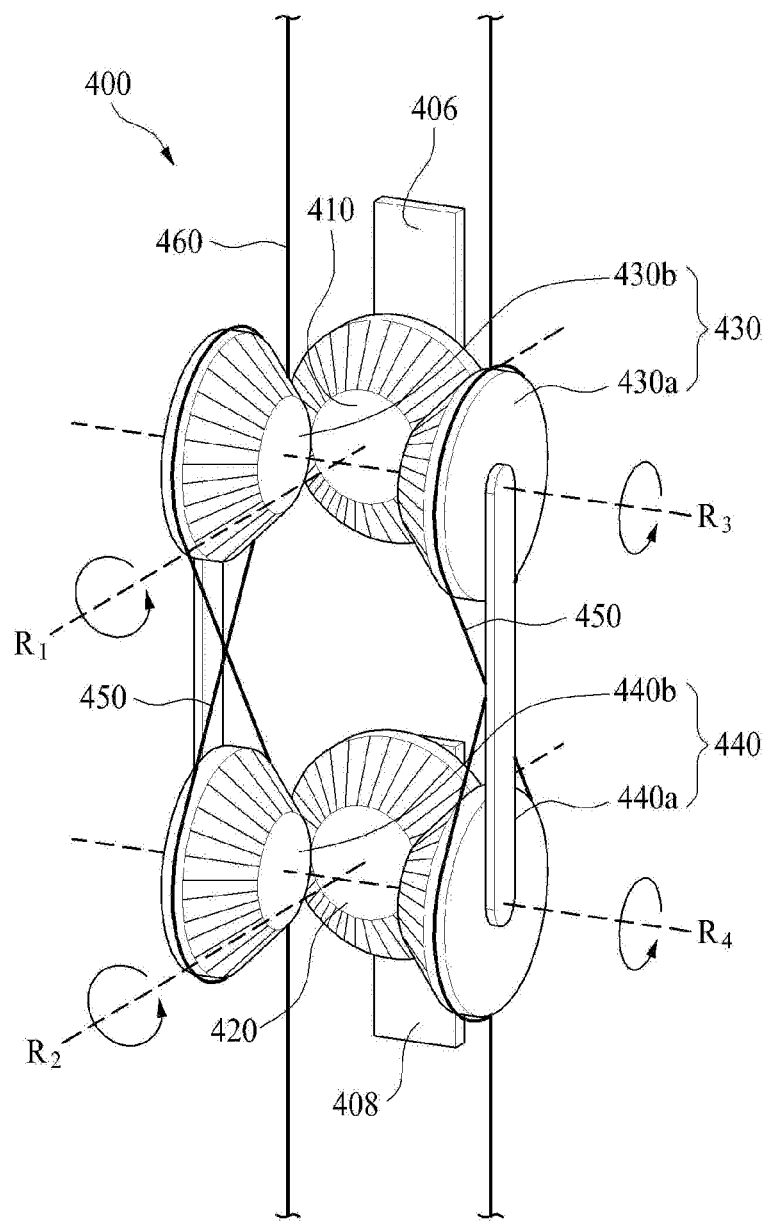

【FIG. 16】
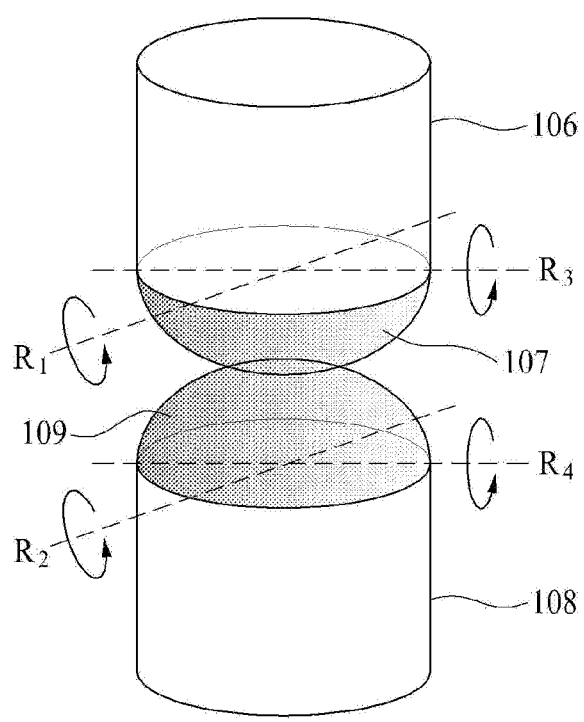

【FIG. 17】
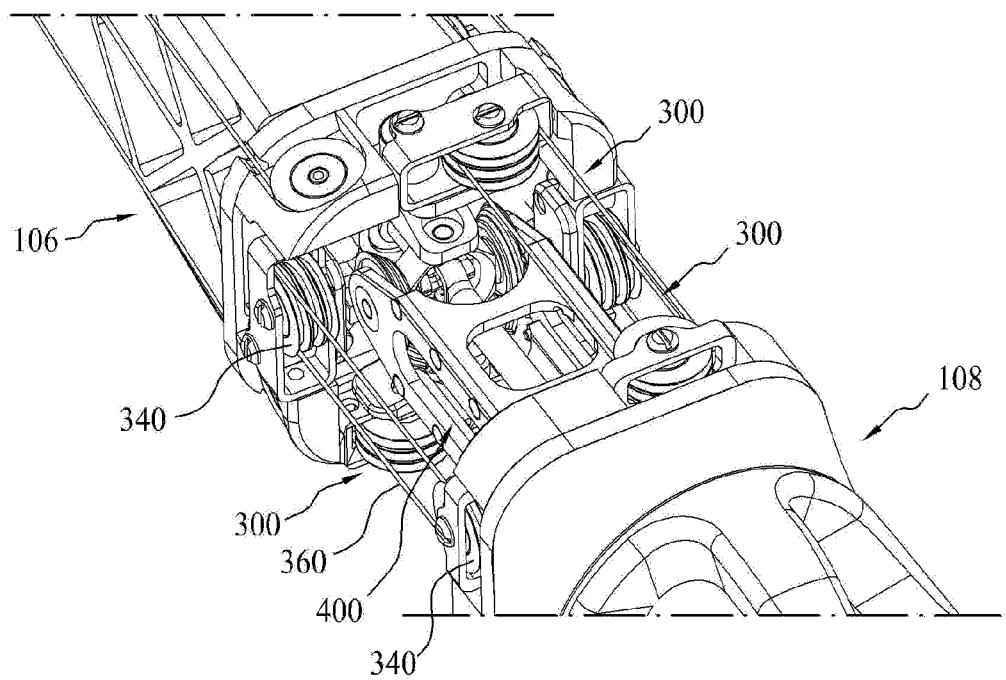

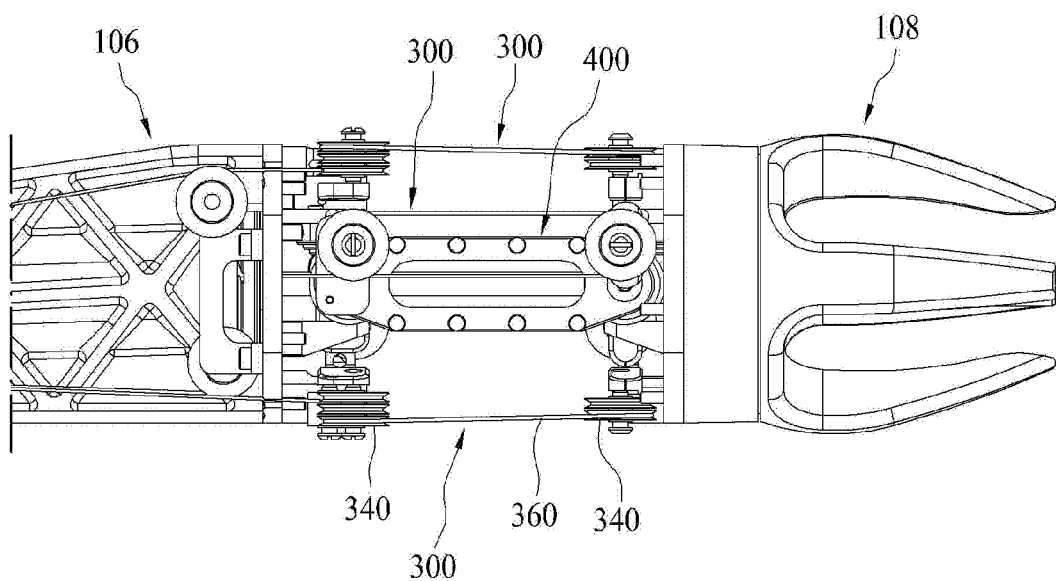
[FIG. 18]

[FIG. 19]
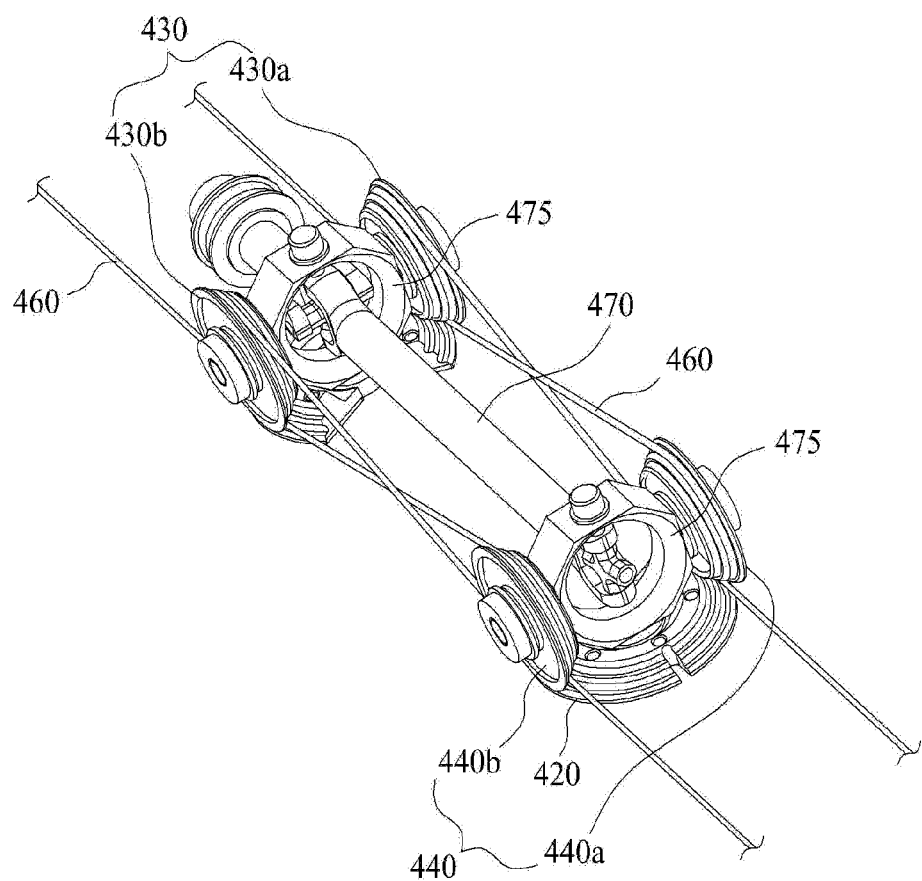

【FIG. 20】
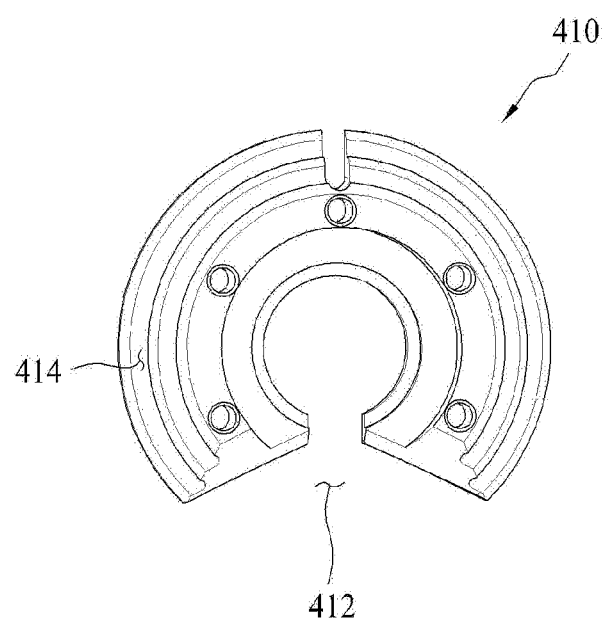

[FIG. 21]
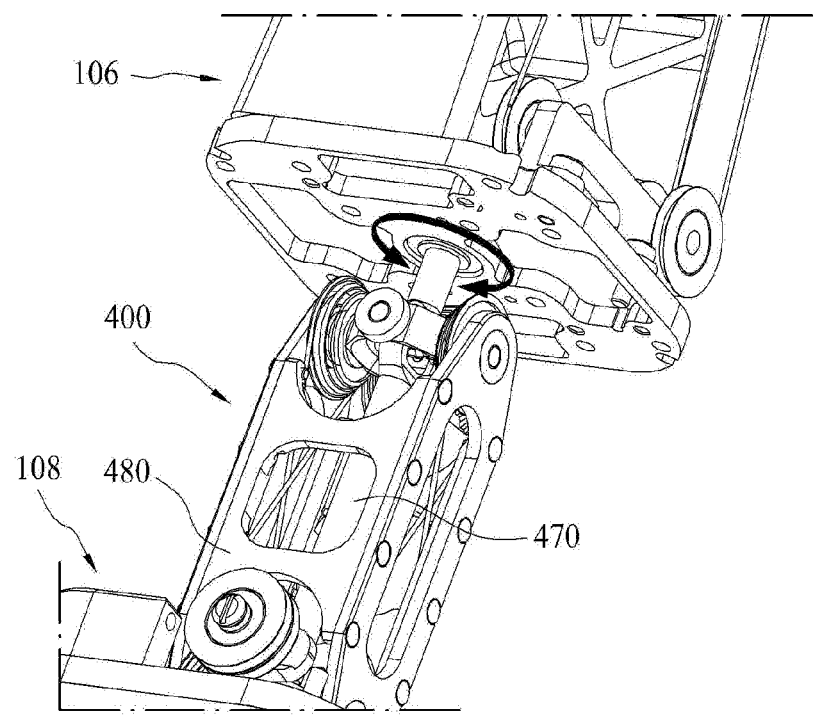

[FIG. 22]
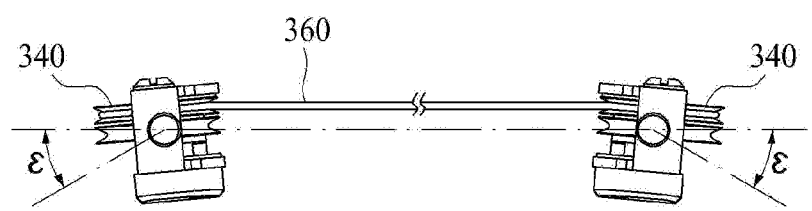

[FIG. 23]
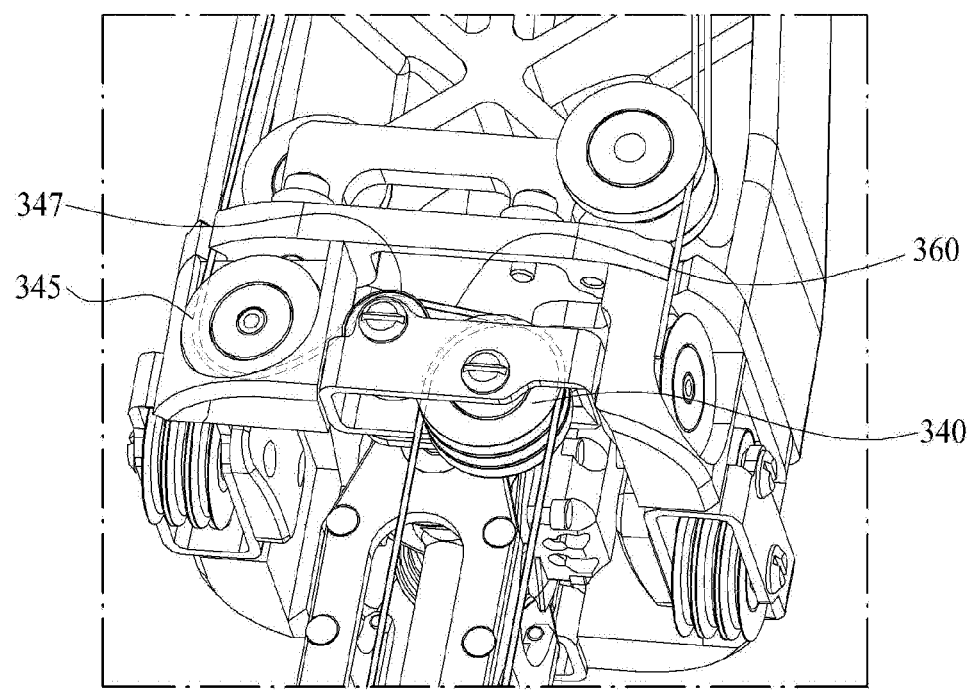

[FIG. 24]
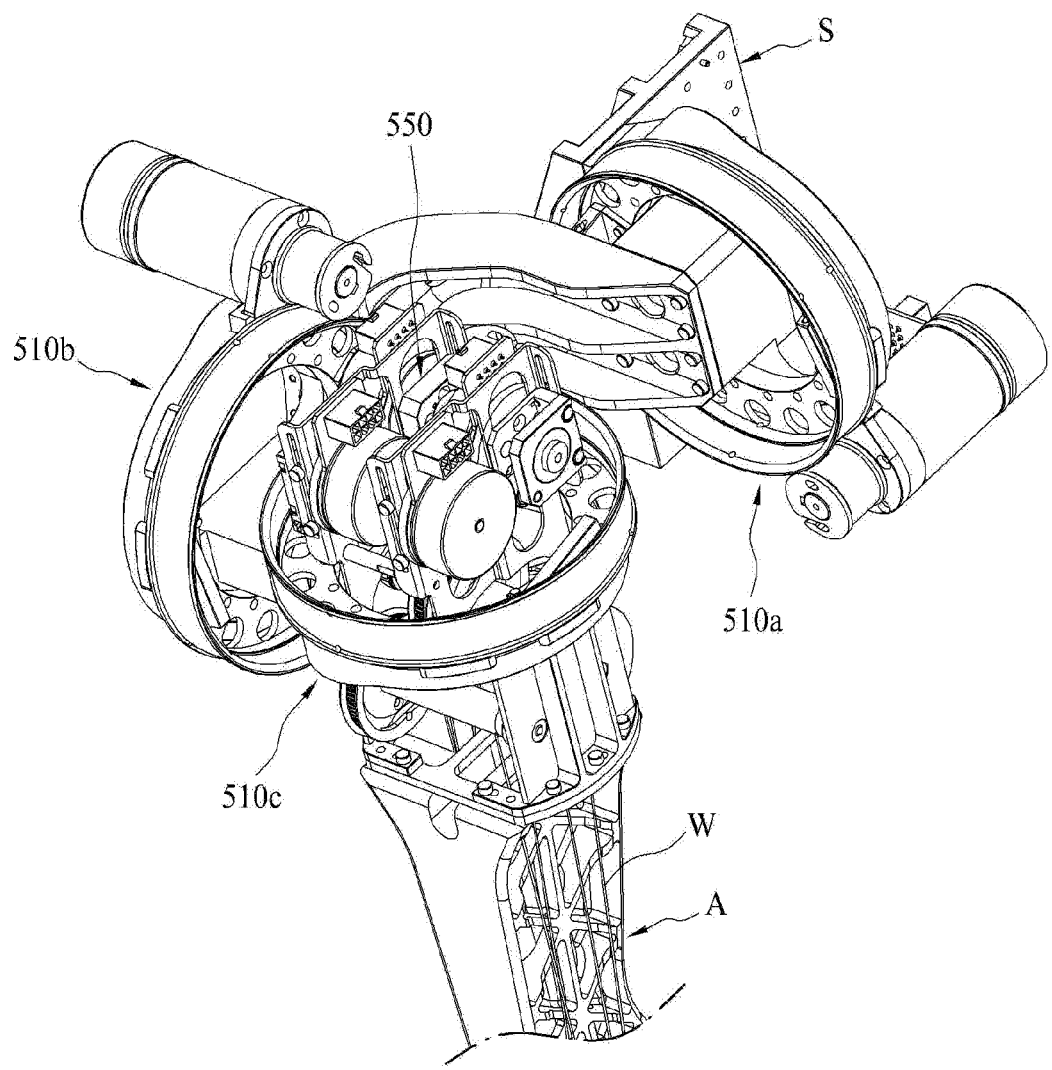

[FIG. 25]
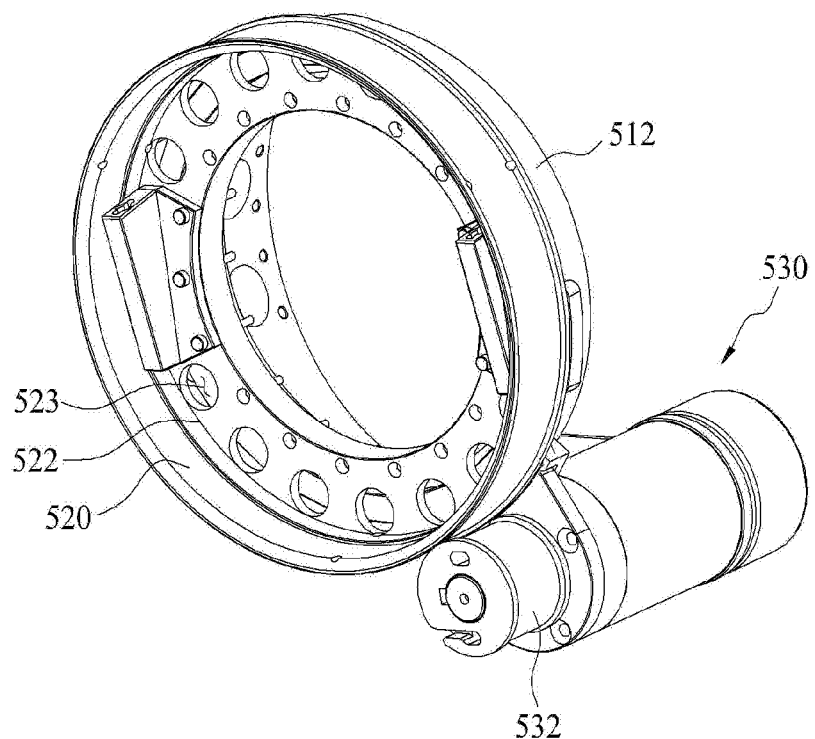

【FIG. 26】
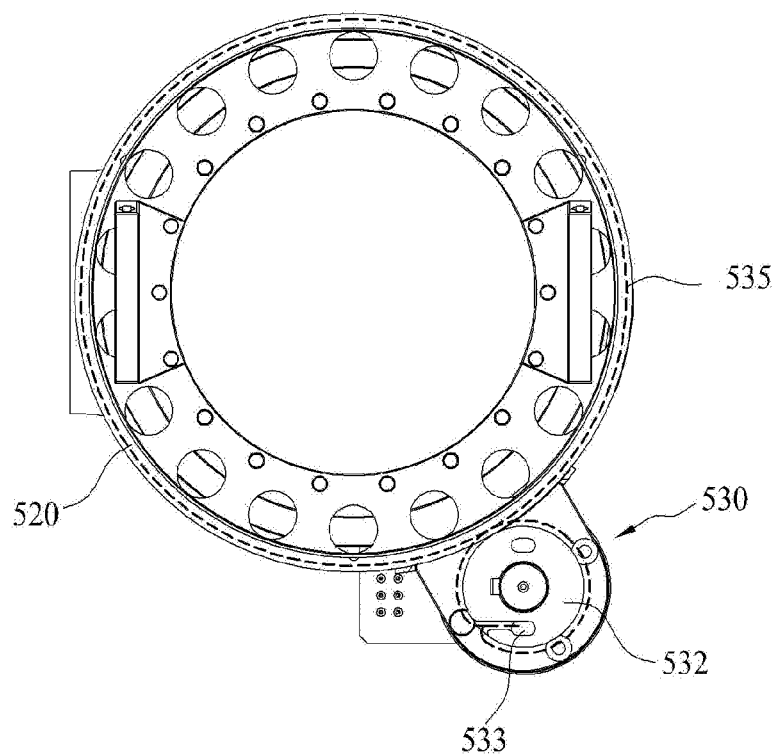

[FIG. 27]
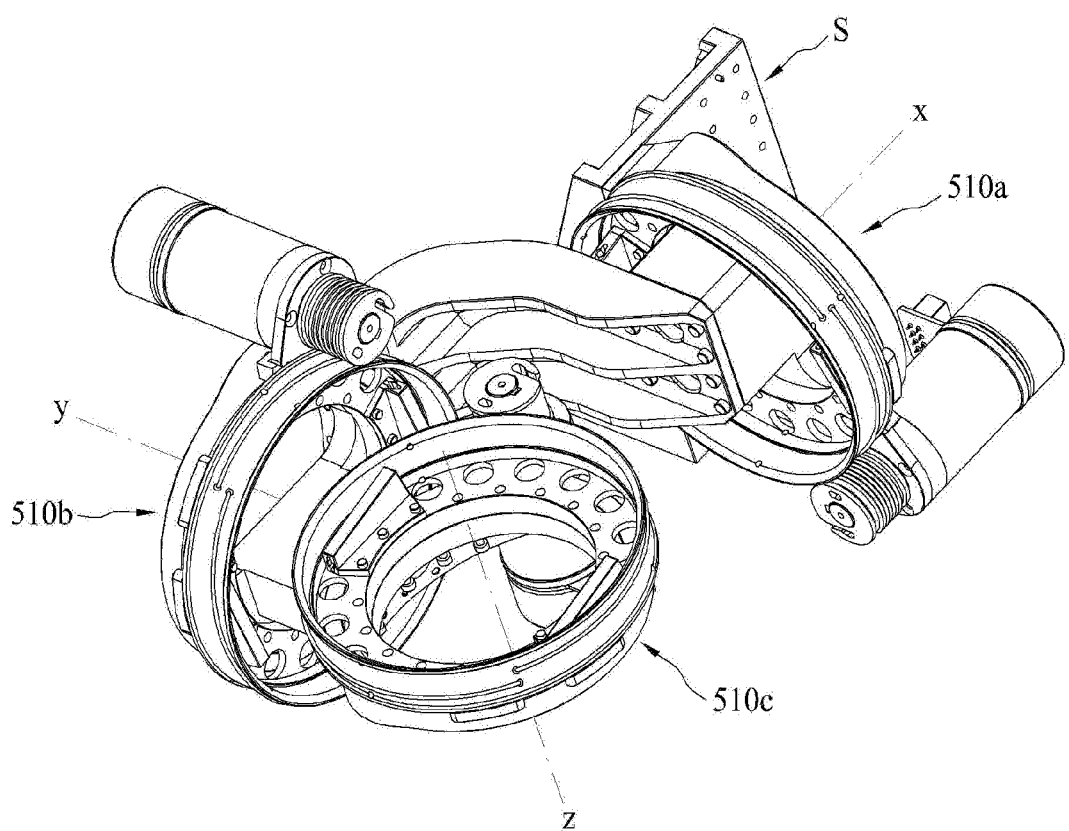

[FIG. 28]
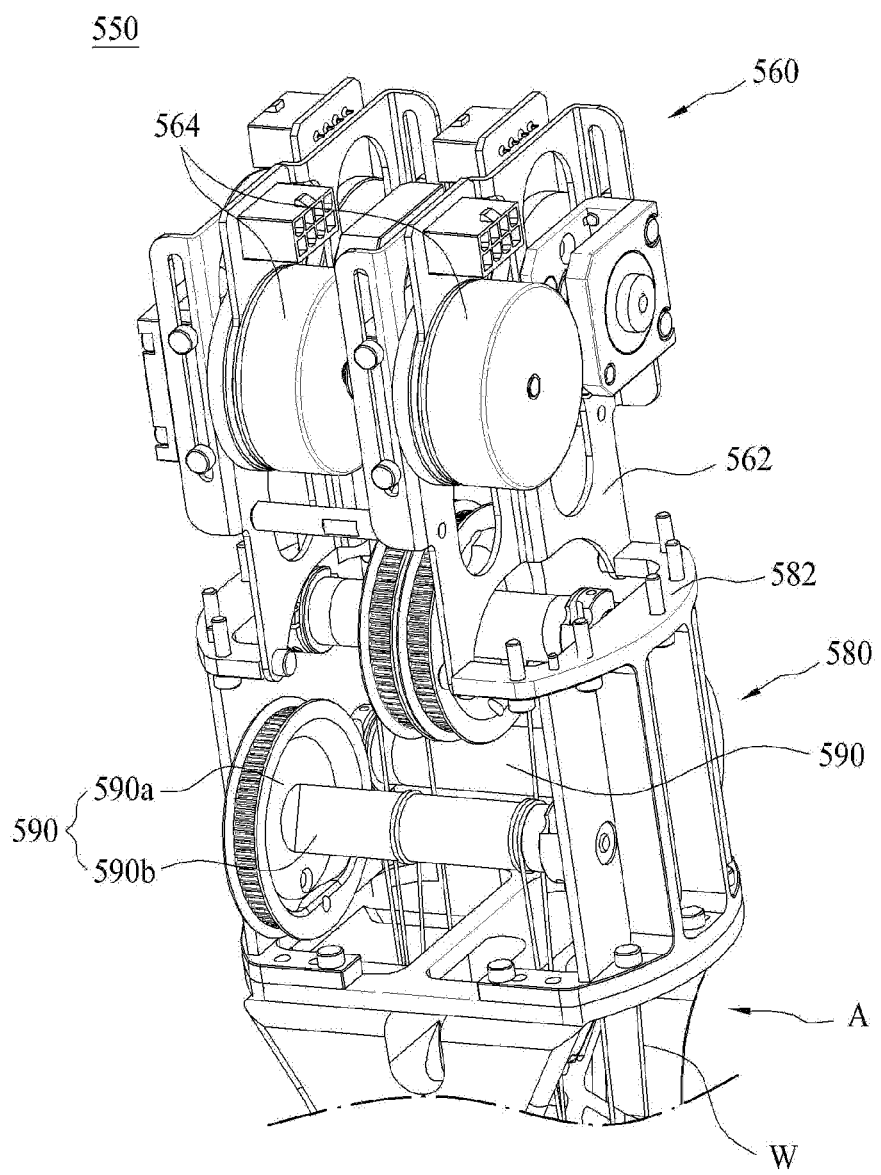

[FIG. 29]
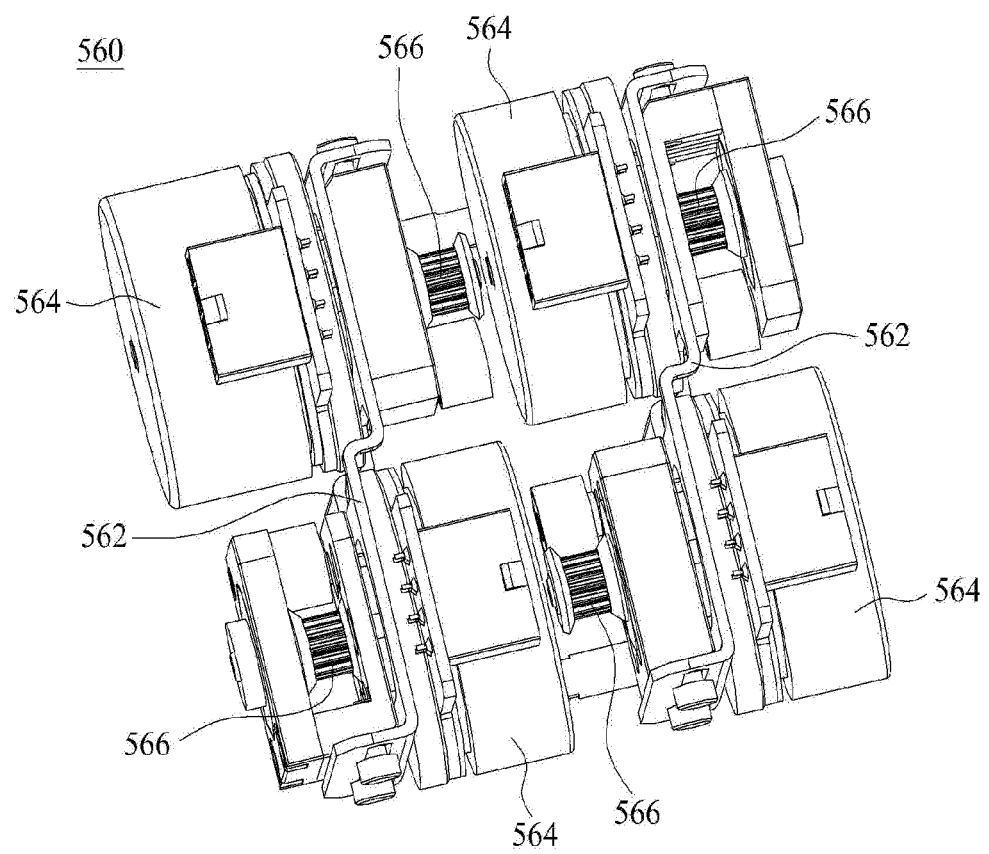

【FIG. 30】
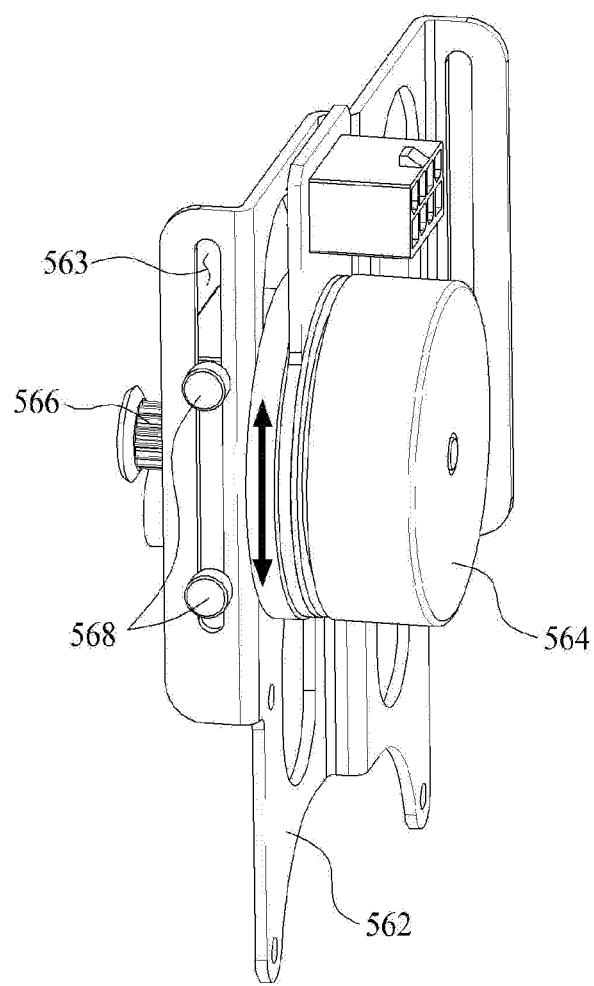

ROBOT ARM

TECHNICAL FIELD

The present invention relates to a robot arm, and more particularly, to a robot arm having a joint structure which has greatly improved strength and rigidity and is simple and light in weight.

BACKGROUND ART

Since Unimate, which is the first industrial robot used for an assembly process in 1962, has been introduced, robot engineering has been established as an essential technology in production, service, medical, exploration, military, and aerospace fields in view of quick technical development and expansion of application fields.

The existing robot has been intended to precisely perform simple repeated work at a high speed, but recently, robots with various manners and various levels, such as a robot which is remotely connected and shares an activity space with humans, a surgical robot which easily performs various operations such as a laparoscopic surgery, and an industrial robot which enables safe physical contact with a human, are being developed.

In addition, in the case of a Baxtor robot, which is developed recently, receives the attention as a next-generation robot which has a function of detecting and adapting to force from a user, enables the user to perform an action while directly moving the robot, and enables cooperation between the human and the robot in the same workspace.

However, the Baxtor robot sacrifices strength, rigidity, precision, and working speed in order to ensure safety, and as a result, there is a problem in that performance thereof deteriorates in comparison with the existing industrial robots.

Therefore, there is a need for a technology about a robot which may detect external force, ensure safety at the time of contact and collision, and satisfy high strength, rigidity, precision, and working speed.

To this end, a technology of implementing a joint of the robot similar to a human's arm having a high degree of freedom become a serious issue as a key research task, and actually, research results reflecting outcomes thereof are being reported.

However, a robot joint structure, which has been researched up to now, has a problem in that a structure thereof is very complicated in order to ensure a multi-degree of freedom and sufficient strength and rigidity, and performance inevitably deteriorates when simplifying the structure.

Accordingly, there is a need for a method for solving the aforementioned problems.

DISCLOSURE

Technical Problem

The present invention has been made in an effort to solve the problems in the related art, and an object of the present invention is to provide a robot arm which has high strength and rigidity, a multi-degree of freedom, and a simple structure, and is light in weight.

Technical problems of the present invention are not limited to the aforementioned technical problems, and other technical problems, which are not mentioned above, may be clearly understood by those skilled in the art from the following descriptions.

Technical Solution

To achieve the aforementioned object, a robot arm according to the present invention includes: a shoulder joint assembly which is connected to an upper arm portion, and includes a drive unit for generating driving power; an elbow joint assembly which is provided between the upper arm portion and a forearm portion, and operates by being supplied with driving power from the drive unit; and a wrist joint assembly which is provided between the forearm portion and a hand portion, and operates by being supplied with driving power from the drive unit.

The elbow joint assembly may include: a stationary member which is connected to the upper arm portion, and has a first curved surface portion formed as at least a part of a circumference of the stationary member is formed in an arc shape; a rotating member which is connected to the forearm portion, has a second curved surface portion formed as at least a part of a circumference of the rotating member is formed in an arc shape being in contact with the first curved surface portion, and is rotated along the first curved surface portion; at least a pair of first pulleys which is eccentrically provided at one side of the stationary member and one side of the rotating member based on a rotation center point with respect to the first curved surface portion and the second curved surface portion; at least a pair of second pulleys which is eccentrically provided at the other side of the stationary member and the other side of the rotating member based on the rotation center point with respect to the first curved surface portion and the second curved surface portion; a first wire part which is wound around the pair of first pulleys, and has one side extending toward the drive unit; and a second wire part which is wound around the pair of second pulleys, and has one side extending toward the drive unit.

The elbow joint assembly may further include a plurality of connecting pulleys which is provided on the stationary member and the rotating member, and changes an extension direction of the other wire part so that the other wire part extending from the drive unit toward the wrist joint assembly does not interfere with a relative rotation between the stationary member and the rotating member.

The multiple other wire parts may be provided and connected to intersect between the plurality of connecting pulleys.

The elbow joint assembly may further include a support bar which connects rotation center points with respect to the first curved surface portion and the second curved surface portion, and supports the stationary member and the rotating member.

The elbow joint assembly may further include a rotation assisting member which intersects at a contact point between the first curved surface portion and the second curved surface portion, is provided to surround both of the circumferences of the stationary member and the rotating member, and induces a rolling motion between the stationary member and the rotating member.

An insertion groove into which the rotation assisting member is inserted may be formed at the circumferences of the stationary member and the rotating member.

The wrist joint assembly may include a multi-degree-of-freedom joint unit which includes: a first bevel gear; a second bevel gear which is spaced apart from the first bevel gear, and has a rotation axis parallel to a rotation axis of the first bevel gear; a pair of third bevel gears which has a rotation axis perpendicular to the rotation axis of the first bevel gear, and rotates while meshing with one side and the other side of the first bevel gear; a pair of fourth bevel gears which has a rotation axis perpendicular to the rotation axis of the second bevel gear, and rotates while meshing with one side and the other side of the second bevel gear; a pair of third wire parts which is wound around the third bevel gears and the fourth bevel gears which correspond to one another, and intersects between the third bevel gears and the fourth bevel gears; and a fourth wire part which is wound around the first bevel gear, and has one side extending toward the drive unit.

The wrist joint assembly may further include a connecting bar which has one side connected to the forearm portion of the robot arm and the other side connected to the hand portion of the robot arm, and fixes the first bevel gear and the second bevel gear.

The connecting bar may be formed to be axially rotatable on at least any one of the forearm portion and the hand portion.

The wrist joint assembly may further include a single-degree-of-freedom joint unit which is formed to surround a circumference of the multi-degree-of-freedom joint unit.

The single-degree-of-freedom joint unit may include: at least a pair of first pulleys; and a first wire part which is wound around the pair of first pulleys a predetermined number of times.

The first wire part may extend toward the drive unit, and the single-degree-of-freedom joint unit may further include a direction changing pulley which changes an extension direction of the first wire part on a route of the first wire part.

The shoulder joint assembly may include: a joint drive unit which operates a wire part for transmitting driving power to the elbow joint assembly and the wrist joint assembly, and is connected to the upper arm portion; and a shoulder drive unit which is connected to the joint drive unit, and implements a motion of a shoulder joint.

The shoulder drive unit may include one or more rotating modules which axially rotate the upper arm portion, the forearm portion, and the hand portion.

The rotating module may include: a first rotating module which has a degree of rotation freedom based on a first axis; a second rotating module which has a degree of rotation freedom based on a second axis perpendicular to the first axis; and a third rotating module which has a degree of rotation freedom based on a third axis perpendicular to the first axis and the second axis.

The rotating module may include: a rotating portion which is connected to other rotating modules or the joint drive unit; a shoulder actuator which generates driving power for rotating the rotating portion; and a fixing portion which fixes the rotating portion in a state in which the rotating portion is rotatable.

The joint drive unit may include: a power transmission module around which the wire part is wound and which includes one or more wire winding members for winding or unwinding the wire part while rotating; and a drive module which includes a wire actuator which corresponds to the single wire winding member and rotates the wire winding member.

The wire winding member may include: a winding portion around which the wire part is wound; and a cooperatively rotating portion which is connected to the wire actuator through a power transmission member.

The wire actuator may be formed to change a separation distance from the wire winding member so as to compensate for a slack of the power transmission member.

Advantageous Effects

The robot arm according to the present invention for achieving the aforementioned objects has the following effects.

First, the robot arm has high strength and rigidity, and excellent precision, thereby quickly performing work.

Second, the robot arm has a simple structure while ensuring strength and rigidity, and as a result, it is possible to make the robot arm light in weight and reduce manufacturing costs.

Third, the drive unit for operating other joints is concentratedly provided on the shoulder, and as a result, it is possible to simplify a structure and a power transmission structure, and easily perform maintenance.

The effects of the present invention are not limited to the aforementioned effects, and other effects, which are not mentioned above, will be clearly understood by those skilled in the art from the claims.

DESCRIPTION OF DRAWINGS

FIG. 1 is a view illustrating a principle of a basic strength and rigidity enhancing structure for implementing the present invention.

FIG. 2 is a view illustrating a single-degree-of-freedom joint unit according to an exemplary embodiment of the present invention.

FIG. 3 is a view illustrating a state in which the single-degree-of-freedom joint unit is rotated in a robot arm according to the exemplary embodiment of the present invention.

FIG. 4 is a view illustrating a relationship of a change in length of a first wire part and a change in length of a second wire part with respect to a rotation of a rotating member in the robot arm according to the exemplary embodiment of the present invention.

FIG. 5 is a view illustrating an elbow joint assembly of the robot arm according to the exemplary embodiment of the present invention when viewed from one side.

FIG. 6 is a view illustrating the elbow joint assembly of the robot arm according to the exemplary embodiment of the present invention when viewed from the other side.

FIGS. 7 and 8 are views illustrating an operating state in accordance with a bending and stretching operation of the elbow joint assembly of the robot arm according to the exemplary embodiment of the present invention.

FIG. 9 is a view illustrating an internal structure of the elbow joint assembly of the robot arm according to the exemplary embodiment of the present invention.

FIG. 10 is a view illustrating an appearance of a stationary member in the elbow joint assembly of the robot arm according to the exemplary embodiment of the present invention.

FIG. 11 is a view illustrating a state in which rotation assisting members are wound around the stationary member and the rotating member in the elbow joint assembly of the robot arm according to the exemplary embodiment of the present invention.

FIG. 12 is a view illustrating an appearance of a first connecting pulley in detail in the elbow joint assembly of the robot arm according to the exemplary embodiment of the present invention.

FIG. 13 is a view illustrating a concept of a multi-degree-of-freedom joint unit in the robot arm according to the exemplary embodiment of the present invention.

FIG. 14 is a view illustrating a combination of the single-degree-of-freedom joint unit and the multi-degree-of-freedom joint unit in the robot arm according to the exemplary embodiment of the present invention.

FIG. 15 is a view illustrating a state in which the multi-degree-of-freedom joint unit is implemented in the robot arm according to the exemplary embodiment of the present invention.

FIG. 16 is a view illustrating a rolling motion of a hemispheric surface corresponding to an operation of the multi-degree-of-freedom joint unit in the robot arm according to the exemplary embodiment of the present invention.

FIG. 17 is a view illustrating a state in which a wrist joint assembly of the robot arm according to the exemplary embodiment of the present invention is specifically implemented.

FIG. 18 is a view illustrating the wrist joint assembly of the robot arm according to the exemplary embodiment of the present invention when viewed from a lateral side.

FIG. 19 is a view illustrating a main part of the wrist joint assembly of the robot arm according to the exemplary embodiment of the present invention.

FIG. 20 is a view illustrating an appearance of a first bevel gear in the wrist joint assembly of the robot arm according to the exemplary embodiment of the present invention.

FIG. 21 is a view illustrating a state in which a connecting bar is axially rotated in the wrist joint assembly of the robot arm according to the exemplary embodiment of the present invention.

FIG. 22 is a view illustrating a state in which a first pulley is inclined at a predetermined angle in accordance with bending and stretching of the wrist joint assembly of the robot arm according to the exemplary embodiment of the present invention.

FIG. 23 is a view illustrating a state in which the first wire part is connected in the wrist joint assembly of the robot arm according to the exemplary embodiment of the present invention.

FIG. 24 is a view illustrating a structure of a shoulder joint assembly of the robot arm according to the exemplary embodiment of the present invention.

FIG. 25 is a view illustrating an appearance of a first rotating module in the shoulder joint assembly of the robot arm according to the exemplary embodiment of the present invention.

FIG. 26 is a view illustrating a rotational structure of the first rotating module in the shoulder joint assembly of the robot arm according to the exemplary embodiment of the present invention.

FIG. 27 is a view illustrating a connection structure of a shoulder drive unit in the shoulder joint assembly of the robot arm according to the exemplary embodiment of the present invention.

FIG. 28 is a view illustrating an appearance of a joint drive unit in the shoulder joint assembly of the robot arm according to the exemplary embodiment of the present invention.

FIG. 29 is a view illustrating an appearance of a drive module in the shoulder joint assembly of the robot arm according to the exemplary embodiment of the present invention.

FIG. 30 is a view illustrating a state in which a wire actuator is moved in the shoulder joint assembly of the robot arm according to the exemplary embodiment of the present invention.

BEST MODE

Hereinafter, an exemplary embodiment of the present invention for specifically accomplishing the objects of the present invention will be described with reference to the accompanying drawings. In the description of the present exemplary embodiment, like terms and like reference numerals are used for like configurations, and additional descriptions for the like configurations will be omitted.

FIG. 1 is a view illustrating a principle of a basic strength and rigidity enhancing structure for implementing the present invention.

As illustrated in FIG. 1, a structure for enhancing strength and rigidity for implementing the present invention includes an actuator 10, an output unit 20, and a wire 30 which connects the actuator 10 and the output unit 20.

In particular, the output unit 20 includes a stationary pulley 22 in a stationary state, and a moving pulley 24 which moves along with a linear movement of the wire 30 by an operation of the actuator 10, and the wire 30 is wound around the stationary pulley 22 and the moving pulley 24 several times.

In this case, assuming that the number of times the wire 30 runs between the stationary pulley 22 and the moving pulley 24 is n, tension T of the actuator and rigidity K of the wire 30 are enhanced to Tout and Kout in the output unit 20 as shown in the following expressions.

$T_{out} = nT$ $K_{out} = n^2 K$

As shown in the above expressions, the tension is enhanced in proportion to n, and the rigidity is enhanced in proportion to the square of n. High rigidity is an essential factor for precise control, and thus is an important property capable of compensating for deterioration in rigidity when the wire 30 is used, and the enhancement of tension is advantageous in increasing a maximum load.

In the case of the present invention, a robot joint assembly is implemented by using the strength and rigidity enhancing structure, and the robot joint assembly will be described below.

Further, for understanding the present invention, a single-degree-of-freedom joint unit, which is applicable to an elbow joint assembly and a wrist joint assembly, will be described first, and then a multi-degree-of-freedom joint unit will be described.

FIG. 2 is a view illustrating a single-degree-of-freedom joint unit 100 in a robot arm according to the exemplary embodiment of the present invention, and FIG. 3 is a view illustrating a state in which the single-degree-of-freedom joint unit 100 is rotated in the robot arm according to the exemplary embodiment of the present invention.

As illustrated in FIGS. 2 and 3, the single-degree-of-freedom joint unit 100 includes a stationary member 120, a rotating member 130, first pulleys 140, second pulleys 150, a first wire part 160a, and a second wire part 160b.

Specifically, at least a part of a circumference of the stationary member 120 is formed to have a first curved surface portion having an arc shape, at least a part of a circumference of the rotating member 130 has a second curved surface portion which has an arc shape and is in contact with the first curved surface portion, and the rotating member 130 is a constituent element that rotates along the first curved surface portion.

In the case of the present exemplary embodiment, the stationary member 120 and the rotating member 130 are entirely formed in a circular shape, but otherwise, only a part of the entire circumference of each of the stationary member 120 and the rotating member 130 may be formed in an arc shape. Further, the second curved surface portion of the rotating member 130 may roll in a state in which the second curved surface portion of the rotating member 130 is in contact with the first curved surface portion of the stationary member 120.

At least a pair of first pulleys 140 is provided, and the pair of first pulleys 140 is eccentrically provided at one side of the stationary member and one side of the rotating member based on a center point with respect to the first curved surface portion and the second curved surface portion. Further, at least a pair of second pulleys 150 is also provided, and the pair of second pulleys 150 is eccentrically provided at the other side of the stationary member and the other side of the rotating member based on the center point with respect to the first curved surface portion and the second curved surface portion.

In the case of the present exemplary embodiment, the first pulleys 140 are positioned at an upper side of centers of the stationary member 120 and the rotating member 130 based on the drawings, and the second pulleys 150 are positioned at a lower side of the centers of the stationary member 120 and the rotating member 130 based on the drawings.

The first wire part 160a is wound around the pair of first pulleys 140a and 140b a predetermined number of times, and one side of the first wire part 160a extends toward a rear side of the stationary member 120. Further, the second wire part 160b is wound around the pair of second pulleys 150a and 150b a predetermined number of times, and one side of the second wire part 160b extends to the rear side of the stationary member 120.

Further, a drive unit of a shoulder joint unit, which will be described below, may be provided at the rear side of the stationary member 120 in order to rotate the rotating member 130 by linearly moving the first wire part 160a and the second wire part 160b in opposite directions.

In this case, the rear side is defined to mean a proceeding direction from the rotating member 130 to the stationary member 120, and a front side is defined to mean a proceeding direction from the stationary member 120 to the rotating member 130.

In the present exemplary embodiment, the first wire part 160a and the second wire part 160b are integrally formed to form a single circulation wire 160, and the circulation wire 160 is wound around a circulation member 110 provided on the drive unit. The circulation member 110 is a constituent element that circulates the circulation wire 160 by being rotated in one direction or the other direction by a first actuator.

That is, in the present exemplary embodiment, both sides of the circulation wire 160 are wound around the pair of first pulleys 140a and 140b and the pair of second pulleys 150a and 150b, respectively, in a state in which the circulation wire 160 is wound around the circulation member 110.

Further, when the circulation member 110 is rotated in one direction as illustrated in FIG. 3, a length of the first wire part 160a is shortened, and the first pulley 140b provided on the rotating member 130 is moved to the first pulley 140a provided on the stationary member 120. On the contrary, when a length of the second wire part 160a is lengthened, the second pulley 150b provided on the rotating member 130 is moved away from the second pulley 150a provided on the stationary member 120.

Therefore, the rotating member 130 rotates while rolling along the circumference of the stationary member 120, and as a result, it is possible to implement a single-degree-of-freedom rotational motion of a joint.

In addition, when the circulation member 110 is rotated in the other direction, the rotating member 130 will be moved in the opposite direction to the aforementioned operation.

As described above, the advantage of the single-degree-of-freedom joint unit 100 of the present invention is that the single-degree-of-freedom joint unit 100 may convert the linear motion into the rotational motion only by using the structure simpler than that in the related art, and the single-degree-of-freedom joint unit 100 may have sufficient rigidity and strength.

Meanwhile, in the present exemplary embodiment, a pair of rotation assisting members 125a and 125b, which serves to allow the rotating member 130 and the stationary member 120 to move along exact routes during a relative rotational motion between the rotating member 130 and the stationary member 120, may be provided on the circumferences of the rotating member 130 and the stationary member 120. In this case, relative rotation directions of the rotating member 130 and the stationary member 120 are opposite to each other, and as a result, the pair of rotation assisting members 125a and 125b intersect each other based on a contact point between the rotating member 130 and the stationary member 120.

That is, the first rotation assisting member 125a extends to surround an upper side of the stationary member 120 and extends to a lower side of the rotating member 130 from the contact point between the rotating member 130 and the stationary member 120, and the second rotation assisting member 125b extends to surround a lower side of the stationary member 120 and extends to an upper side of the rotating member 130 from the contact point between the rotating member 130 and the stationary member 120.

In this case, the rotation assisting members 125a and 125b may be formed in the form of a wire, but may be implemented in various forms such as a belt.

FIG. 4 is a view illustrating a relationship of a change in length of the first wire part and a change in length of the second wire part with respect to the rotation of the rotating member 130 in the single-degree-of-freedom joint unit 100 of the robot arm according to the first exemplary embodiment of the present invention.

A length L1 of the first wire part wound around the pair of first pulleys and a length L2 of the second wire part wound around the pair of second pulleys satisfy the following relationship formulas on the assumption that a diameter of each of the rotating member 130 and the stationary member 120 is d, a distance between the first pulley and the second pulley which correspond to each other is W, and the rotating member 130 is rotated by θ based on FIG. 4.

$$L_1 = n\left(d - W\sin\frac{\theta}{2}\right)$$

$$L_2 = n\left(d + W\sin\frac{\theta}{2}\right)$$

As can be seen from the above formulas, the motions of the first wire part and the second wire part may be controlled by using the single actuator because the first wire part and the second wire part are symmetrically moved.

Therefore, the present exemplary embodiment described above is implemented such that the first wire part and the second wire part are formed as the single circulation wire, and the circulation wire is operated only by the rotation of the circulation member by the first actuator.

The single-degree-of-freedom joint unit 100 may be intactly applied to an elbow joint assembly of the robot arm according to the present invention. Hereinafter, a structure of the elbow joint assembly will be described.

FIG. 5 is a view illustrating the elbow joint assembly of the robot arm according to the exemplary embodiment of the present invention when viewed from one side, and FIG. 6 is a view illustrating the elbow joint assembly of the robot arm according to the exemplary embodiment of the present invention when viewed from the other side.

The respective constituent elements of the single-degree-of-freedom joint unit 100 are implemented in the elbow joint assembly illustrated in FIGS. 5 to 6. Specifically, a stationary member 220, a rotating member 230, first pulleys 240, second pulleys 250, a first wire part 260a, and a second wire part 260b are implemented. Further, the stationary member 220 is connected to an upper arm portion 104, and the rotating member 230 is connected to a forearm portion 106.

In a second exemplary embodiment of the present invention, the stationary member 220 and the rotating member 230 do not have a completely circular shape, and only a part of each of the stationary member 220 and the rotating member 230 is formed in an arc shape, such that the stationary member 220 has a first curved surface portion 222, and the rotating member 230 has a second curved surface portion 232. Therefore, the rotating member 230 may rotate by a length of the first curved surface portion 222 and a length of the second curved surface portion 232, and a joint motion corresponding to a human's elbow may be implemented by using the rotation of the rotating member 230.

Meanwhile, in the case of the present exemplary embodiment, connecting pulleys 270a, 270b, 270c, and 270d may be further included. The connecting pulleys 270a, 270b, 270c, and 270d are constituent elements which change an extension direction so that the other wire parts, which extend from a drive unit to other joints such as a wrist, do not interfere with a relative rotation between the stationary member 220 and the rotating member 230.

Specifically, in the case of the present exemplary embodiment, the second connecting pulley 270b is provided at a center point of the stationary member 220 with respect to the first curved surface portion, and the first connecting pulley 270a is provided at a rear side of the second connecting pulley 270b.

Further, the third connecting pulley 270c is provided at a center point of the rotating member 230 with respect to the second curved surface portion, and the fourth connecting pulley 270d is provided at a front side of the third connecting pulley 270c.

In this case, as illustrated in FIGS. 7 and 8, the other wire parts 275a and 275b are connected so as to intersect each other between the adjacent connecting pulleys 270a and 270d, and therefore, lengths of the other wire parts 275a and 275b are not changed even though the upper arm portion 104 and the forearm portion 106 can form any angle.

Therefore, it is possible to transmit driving power to other joints without interference with the operation of the elbow joint assembly.

FIG. 9 is a view illustrating an internal structure of the elbow joint assembly of the robot arm according to the exemplary embodiment of the present invention.

As illustrated in FIG. 9, in the present exemplary embodiment, there is provided a support bar 280 which connects rotation center points with respect to the first curved surface portion 222 and the second curved surface portion 232.

The support bar 280 supports the stationary member 220 and the rotating member 230 to prevent the stationary member 220 and the rotating member 230 from being withdrawn during the relative rotation between the stationary member 220 and the rotating member 230, and further, the support bar 280 serves to connect the upper arm portion 104 and the forearm portion 106. Further, in the case of the present exemplary embodiment, a hollow portion is formed in the support bar 280 in order to reduce a weight of the support bar 280.

Therefore, the stationary member 220 and the rotating member 230 may be stably rotated relative to each other about both ends of the support bar 280.

In addition, in the case of the present exemplary embodiment, auxiliary pulleys 251, which change extension directions of the first wire part 260a and the second wire part 260b, are further provided between a drive unit (not illustrated) provided at a rear side of the stationary member 220 and the first pulley 240a of the stationary member 220 and between the drive unit and the second pulley 250a of the stationary member 220.

If the auxiliary pulleys 251 are not provided, the first wire part 260a and the second wire part 260b are likely to be withdrawn from the first pulley 240a and the second pulley 250a as the rotating member 230 is rotated. Therefore, in the case of the present exemplary embodiment, the auxiliary pulleys 251 are further provided to change the extension directions of the first wire part 260a and the second wire part 260b in order to prevent the first wire part 260a and the second wire part 260b from being affected by the rotation of the rotating member 230.

Further, the auxiliary pulleys 251 may be provided both outside and inside the stationary member 220.

FIG. 10 is a view illustrating an appearance of the stationary member 220 in the elbow joint assembly of the robot arm according to the exemplary embodiment of the present invention, and FIG. 11 is a view illustrating a state in which rotation assisting members 225a and 225b are wound around the stationary member 220 and the rotating member 230 in the elbow joint assembly of the robot arm according to the exemplary embodiment of the present invention.

As described above, the pair of rotation assisting members 225a and 225b, which serves to allow the rotating member 230 and the stationary member 220 to move along exact routes during a relative rotational motion between the rotating member 230 and the stationary member 220, may be provided on the circumferences of the rotating member 230 and the stationary member 220. Further, the configuration in which the pair of rotation assisting members 225a and 225b intersect each other based on the contact point between the rotating member 230 and the stationary member 220 has been already described.

Further, in the case of the present exemplary embodiment, insertion grooves 224 into which the rotation assisting members 225a and 225b are inserted are formed along the circumferences of the stationary member 220 and the rotating member 230. That is, the rotation assisting members 225a and 225b are inserted into the insertion grooves 224 and thus do not protrude outward, and as a result, the rotation assisting members 225a and 225b do not interfere with the rotations of the stationary member 220 and the rotating member 230.

In addition, in the present exemplary embodiment, fixing units 226a and 226b, which may fix both sides of the rotation assisting members 225a and 225b, are provided at both ends of the insertion grooves 224. That is, since the fixing units 226a and 226b are provided, the rotation assisting members 225a and 225b may be formed to surround only portions corresponding to the first curved surface portion 222 or the second curved surface portion 232.

FIG. 12 is a view illustrating an appearance of the first connecting pulley 270a in detail in the elbow joint assembly of the robot arm according to the exemplary embodiment of the present invention.

As illustrated in FIG. 12, in the present exemplary embodiment, the first connecting pulley 270a is formed to be rotatable about a rotating shaft 271, and has a plurality of wire accommodating grooves 272 formed in parallel.

Therefore, in the case of the present exemplary embodiment, the plurality of wire parts may be simultaneously wound around the single first connecting pulley 270a, and as a result, the structure may be further simplified. That is, in the present exemplary embodiment, the first connecting pulley 270a may have a structure in which a plurality of pulleys each having the single wire accommodating groove 272 is provided to be connected to one another in parallel in a lateral direction, and the plurality of pulleys may of course be individually rotated.

Further, this configuration may be equally applied to other connecting pulleys, the first pulley, the second pulley, and the auxiliary pulley in addition to the first connecting pulley 270a.

The elbow joint assembly according to the present exemplary embodiment has been described above, and a wrist joint assembly according to the present exemplary embodiment will be described hereinafter. In addition to the single-degree-of-freedom joint unit applied to the aforementioned elbow joint assembly, a multi-degree-of-freedom joint unit may be applied to the wrist joint assembly.

FIG. 13 is a view illustrating a concept of the multi-degree-of-freedom joint unit in the robot arm according to the exemplary embodiment of the present invention.

The aforementioned single-degree-of-freedom joint unit has a single degree of freedom, but it is not easy to implement a high-degree-of-freedom joint such as a wrist or a shoulder only by the structure of the single-degree-of-freedom joint unit. Of course, the high-degree-of-freedom joint may be implemented by connecting a plurality of single-degree-of-freedom joint units, but there is a problem in that the structure is very complicated, and a volume and a weight are increased.

Therefore, the present invention suggests the multi-degree-of-freedom joint unit based on the concept illustrated in FIG. 13. As illustrated, in the multi-degree-of-freedom joint unit according to the present invention, the forearm portion 106 and a hand portion 108 are formed to have hemispheric surfaces 107 and 109, respectively, and are configured to be in contact with each other. Further, in this state, four single-degree-of-freedom joint units 100, which are symmetrically provided at the opposite sides, are provided along the circumferences of the hemispheric surfaces 107 and 109.

Therefore, the two hemispheric surfaces 107 and 109 roll with respect to each other, and the four single-degree-of-freedom joint units 100 support the structure and form a single degree of freedom together with the single-degree-of-freedom joint unit 100 positioned at the opposite side.

However, in the case in which the multi-degree of freedom is implemented by the hemispheric surfaces 107 and 109, there is a problem in that it is difficult for the contact point to withstand a load caused by torsion. Therefore, in the present invention, the rolling motions of the hemispheric surfaces 107 and 109 are reproduced through other methods.

FIG. 14 is a view illustrating a combination of the single-degree-of-freedom joint unit 100 and a multi-degree-of-freedom joint unit 200 in the robot arm according to the exemplary embodiment of the present invention, and a joint of the robot arm having the multi-degree of freedom may be finally implemented as described below.

As illustrated in FIG. 14, the plurality of single-degree-of-freedom joint units 100 is provided between the forearm portion 106 and the hand portion 108 so as to form an accommodation space S therein, and the plurality of single-degree-of-freedom joint units 100 is provided at symmetrical positions. Further, the multi-degree-of-freedom joint unit 200, instead of the hemispheric surfaces, is provided at a central portion of the accommodation space S.

Therefore, the rolling motions of the two hemispheric surfaces are implemented by the multi-degree-of-freedom joint unit 200, and the four single-degree-of-freedom joint units 100 support the structure and form the single degree of freedom together with another single-degree-of-freedom joint unit 100 positioned at the opposite side, such that a total of two degrees of freedom may be provided.

A total of four single-degree-of-freedom joint units 100 are provided in the case of the present exemplary embodiment, but otherwise, more than four single-degree-of-freedom joint units 100 may of course be provided.

Meanwhile, in the present exemplary embodiment, the strength and rigidity enhancing structure described with reference to FIG. 1 may be applied instead of the single-degree-of-freedom joint unit 100.

FIG. 15 is a view illustrating a state in which the multi-degree-of-freedom joint unit 200 is implemented in the robot arm according to the exemplary embodiment of the present invention, and FIG. 16 is a view illustrating the rolling motions of the hemispheric surfaces corresponding to the operation of the multi-degree-of-freedom joint unit in the robot arm according to the exemplary embodiment of the present invention.

As illustrated in FIGS. 15 and 16, a multi-degree-of-freedom robot joint assembly 400 according to the present exemplary embodiment includes a first bevel gear 410, a second bevel gear 420, third bevel gears 430, fourth bevel gears 440, third wire parts 450, and fourth wire parts 460.

The first bevel gear 410 and the second bevel gear 420 are connected to the opposite arms through connecting portions 406 and 408 and are spaced apart from each other. Further, in the present exemplary embodiment, a rotation axis of the first bevel gear 410 and a rotation axis of the second bevel gear 420 are formed in parallel with each other.

However, unlike the present exemplary embodiment, the first bevel gear 410 and the second bevel gear 420 may be implemented to be operated in a state in which the rotation axes of the first bevel gear 410 and the second bevel gear 420 are not in parallel with each other.

In addition, the pair of third bevel gears 430 is provided, has rotation axes perpendicular to the rotation axis of the first bevel gear 410, and rotates while meshing with one side and the other side of the first bevel gear 410.

Further, the pair of fourth bevel gears 440 is also provided, has rotation axes perpendicular to the rotation axis of the second bevel gear 420, and rotates while meshing with one side and the other side of the second bevel gear 420.

In this state, the third wire parts 450 are wound around the third bevel gears 430 and the fourth bevel gears 440 which correspond to one another, and the third wire parts 450 are formed to intersect each other between the third bevel gears 430 and the fourth bevel gears 440.

That is, based on a viewpoint at which gear teeth are visible, when the first bevel gear 410 is rotated in one direction R1, the third bevel gears 430a and 430b are also rotated in one direction R3, the fourth bevel gears 440a and 440b are rotated in another direction –R4 by the third wire parts 450, and the second bevel gear 420 is rotated in another direction –R2. This configuration is shown as the following expressions.

$$R1 = -R2$$

$$R3 = -R4$$

That is, when the first bevel gear 410 is rotated in one direction, the second bevel gear 420 is rotated in the other direction, and the connecting portion 408 and the hand portion 108, which are connected to the second bevel gear 420, are twisted along the second bevel gear 420, such that the rolling motions of the hemispheric surfaces 107 and 109 may be reproduced.

Meanwhile, in the case of the present exemplary embodiment, the fourth wire parts 460, which are wound around the first bevel gear 410 and each have one side extending toward the drive unit, may be further provided, and the drive unit may rotate the first bevel gear 410 by linearly moving the fourth wire parts 460.

FIG. 17 is a view illustrating a state in which the wrist joint assembly of the robot arm according to the exemplary embodiment of the present invention is specifically implemented, and FIG. 18 is a view illustrating the wrist joint assembly of the robot arm according to the exemplary embodiment of the present invention when viewed from a lateral side.

As illustrated in FIGS. 17 and 18, the wrist joint assembly of the robot arm according to the exemplary embodiment of the present invention is provided between the forearm portion 106 and the hand portion 108, and includes the multi-degree-of-freedom joint unit 400, and a plurality of single-degree-of-freedom joint units 300 which surrounds a circumference of the multi-degree-of-freedom joint unit 400.

Here, the single-degree-of-freedom joint unit 300 includes at least a pair of first pulleys 340, and a first wire part 360 which is wound around the pair of first pulleys 340 a predetermined number of times. That is, the first wire part 360 extends toward the drive unit, and may change a separation distance between the first pulleys 340 by using driving power of the drive unit.

In this case, the opposite single-degree-of-freedom joint unit 300 provided at the opposite side based on the multi-degree-of-freedom joint unit 400 also has the first pulleys 340, such that a single degree of freedom is formed by an interaction between the single-degree-of-freedom joint units 300.

FIG. 19 is a view illustrating a main part of the wrist joint assembly of the robot arm according to the exemplary embodiment of the present invention.

FIG. 19 illustrates the appearance of the multi-degree-of-freedom joint unit, and the multi-degree-of-freedom joint unit includes the first bevel gear 410, the second bevel gear 420, the third bevel gears 430, the fourth bevel gears 440, the third wire parts 450, and the fourth wire parts 460. That is, because the respective constituent elements are identical to those described in FIG. 6, a detailed description thereof will be omitted. However, in the case of the present exemplary embodiment, a connecting bar 470 and fixing rings 475 are further included to expand the degree of freedom.

One side of the connecting bar 470 is connected to the forearm portion 106 of the robot arm, and the other side of the connecting bar 470 is connected to the hand portion of the robot arm 108. Further, the connecting bar 470 serves to simultaneously fix the first bevel gear 410 and the second bevel gear 420. More specifically, in the present exemplary embodiment, the connecting bar 470 is penetratively fixed into hollow portions of the pair of fixing rings 475, and the first bevel gear 410, the second bevel gear 420, the third bevel gears 430, and the fourth bevel gears 440 are fixed to the fixing rings 475.

In this case, in the present exemplary embodiment, the first bevel gear 410 has a shape in which an arc 412 is partially omitted from the entire circumference, as illustrated in FIG. 20. This configuration serves to restrict a maximum angle at which the third bevel gears 430 and the fourth bevel gears 440 are rotatable along a wire groove 414 of the first bevel gear 410. This configuration may be equally identical to the second bevel gear 420.

In addition, in the case of the present exemplary embodiment, the respective bevel gears 410 to 440 are rotated in conjunction with one another by the wire disposed in the wire groove 414, but the present invention is not limited thereto, and the respective bevel gears 410 to 440 may be rotated in conjunction with one another by a general gear.

FIG. 21 is a view illustrating a state in which the connecting bar 470 is axially rotated in the wrist joint assembly of the robot arm according to the exemplary embodiment of the present invention.

As illustrated in FIG. 21, one side and the other end of the connecting bar 470 are connected to the forearm portion 106 and the hand portion 108, respectively, and in this case, the connecting bar 470 may be formed to be axially rotatable with respect to at least one of the forearm portion 106 and the hand portion 108. The advantage of this configuration is that a rotational motion of the wrist may be reproduced in addition to bending and stretching of the wrist.

Meanwhile, in the case of the present exemplary embodiment, a protective frame 480, which is formed to surround the circumference of the multi-degree-of-freedom joint unit 400 in order to stabilize the structure, may be further included. The protective frame 480 serves to protect the multi-degree-of-freedom joint unit 400 in order to prevent the multi-degree-of-freedom joint unit 400 from being damaged by external force, and the protective frame 480 serves to stably support the respective constituent elements of the multi-degree-of-freedom joint unit 400.

More specifically, the protective frame 480 may include a first frame which supports the third bevel gear 430 and the fourth bevel gear 440 at one side, among the pair of third bevel gears 430 and the pair of fourth bevel gears 440, so that the third bevel gear 430 and the fourth bevel gear 440 are rotatable, and a second frame which supports the third bevel gear 430 and the fourth bevel gear 440 at the other side so that the third bevel gear 430 and the fourth bevel gear 440 are rotatable.

The first frame and the second frame are positioned at the opposite sides, and each may stably support the single third bevel gear 430 and the single fourth bevel gear 440 and further increase rigidity of the structure.

Further, in this case, a third frame, which supports a portion between the first frame and the second frame spaced apart from each other, may be further included between the first frame and the second frame. In the case in which the third frame is further provided as described above, a more rigid structure may of course be formed.

FIG. 22 is a view illustrating a state in which the first pulleys 340 are inclined at a predetermined angle in accordance with the bending and stretching of the wrist joint assembly of the robot arm according to the exemplary embodiment of the present invention, and FIG. 23 is a view illustrating a state in which the first wire part 360 is connected in the wrist joint assembly of the robot arm according to the exemplary embodiment of the present invention.

As illustrated in FIG. 22, when the wrist joint assembly bends and stretches in any one direction, the pair of first pulleys 340 provided at a side in the bending and stretching direction is rotated to be inclined at a predetermined angle ε.

In addition, because the first pulleys 340 are inclined toward the opposite sides, a relative angle of any one first pulley 340 with respect to the other first pulley 340 is increased twice. In the case in which the first pulleys 340 are inclined as described above, there is a problem in that the first wire part 360 may be withdrawn.

Therefore, in the case of the present exemplary embodiment, as illustrated in FIG. 23, a direction changing pulley 345, which changes the extension direction of the first wire part 360, is further included on a route of the first wire part 360 extending toward the drive unit at the rear side.

The direction changing pulley 345 is provided at a lateral side of the first pulley 340 so as to enable the first wire part 360 to change the direction thereof to a lateral direction from the first pulley 340, thereby preventing the first wire part 360 from being withdrawn due to the bending and stretching of the joint.

In addition, in the case of the present exemplary embodiment, an auxiliary direction changing pulley 347 is further provided between the direction changing pulley 345 and the first pulley 340 in order to stably operate the first wire part 360.

The wrist joint assembly according to the present exemplary embodiment has been described as described above, and a shoulder joint assembly including a drive unit for operating the elbow joint assembly and the wrist joint assembly will be described below.

FIG. 24 is a view illustrating a structure of the shoulder joint assembly of the robot arm according to the exemplary embodiment of the present invention.

As illustrated in FIG. 24, the shoulder joint assembly of the robot arm according to the exemplary embodiment of the present invention includes a joint drive unit 550 and shoulder drive units 510a to 510c.

The joint drive unit 550 is a constituent element which is connected to the upper arm portion of the robot arm, and operates a plurality of wire parts W that transmits driving power to the elbow joint assembly and the wrist joint assembly.

Further, the shoulder drive units 510a to 510c are constituent elements which are connected to the joint drive unit 550 and implement a motion of a shoulder joint.

That is, the shoulder joint assembly may broadly include the shoulder drive units 510a to 510c which implement the motion of the shoulder, and the joint drive unit 550 which generates and transmits driving power for operating the elbow joint or the wrist joint.

First, the shoulder drive units 510a to 510c will be described.

The shoulder drive units 510a to 510c may include one or more rotating modules for axially rotating the upper arm portion, the forearm portion, and the hand portion, that is, the entire arm A.

In the case of the present exemplary embodiment, the shoulder drive units 510a to 510c include a first rotating module 510a, a second rotating module 510b, and a third rotating module 510c.

Specifically, the first rotating module 510a is connected to a fixing unit S such as a main body or a mount, and the third rotating module 510c is connected to the joint drive unit 550. Further, the second rotating module 510b is provided between the first rotating module 510a and the third rotating module 510c.

As described above, the first rotating module 510a, the second rotating module 510b, and the third rotating module 510c may provide degrees of rotation freedom based on rotation axes in different directions.

In addition, methods of operating the first rotating module 510a, the second rotating module 510b, and the third rotating module 510c are identical to one another, and the first rotating module 510a will be representatively described below.

FIG. 25 is a view illustrating an appearance of the first rotating module 510a in the shoulder joint assembly of the robot arm according to the exemplary embodiment of the present invention, and FIG. 26 is a view illustrating a rotational structure of the first rotating module 510a in the shoulder joint assembly of the robot arm according to the exemplary embodiment of the present invention.

As illustrated in FIG. 25, the first rotating module 510a includes a rotating portion 520, a fixing portion 512, and a shoulder actuator 530. The rotating portion 520 is connected to other rotating modules or other joint drive units, and may be rotated by the shoulder actuator 530 that generates driving power.

More specifically, the rotating portion 520 is formed in a circular shape, and in this case, the shoulder actuator 530 is provided with a rotation inducing portion 532 which has an outer circumferential surface being in contact with an outer circumferential surface of the rotating portion 520 and rotates the rotating portion 520 while being rotated by the shoulder actuator 530.

In the case of the present exemplary embodiment, a diameter of the rotation inducing portion 532 is smaller than a diameter of the rotating portion 520, and a speed reducer may be embedded in the shoulder actuator 530. Therefore, the rotation inducing portion 532 may further amplify driving power of the shoulder actuator 530 through a gear ratio of the speed reducer.

Further, as illustrated in FIG. 26, the present exemplary embodiment further includes an auxiliary winding member 535 which intersects at a contact point between the rotating portion 520 and the rotation inducing portion 532, and is wound around an outer circumferential surface of the rotating portion 520 and an outer circumferential surface of the rotation inducing portion 532.

The auxiliary winding member 535 may not only more increase rotational force of the rotating portion 520, but also prevent slipping between the rotation inducing portion 532 and the rotating portion 520.

In this case, fixing grooves 533 into which one end and the other end of the auxiliary winding member 535 are fixed are formed in the rotation inducing portion 532, and the auxiliary winding member 535 entirely has an "8" shape and circulates along the outer circumferential surface of the rotating portion 520 and the outer circumferential surface of the rotation inducing portion 532.

Meanwhile, unlike the present exemplary embodiment, the auxiliary winding member 535 may not be provided, and various structures such as a structure in which the rotating portion 520 and the rotation inducing portion 532 are formed in the form of a gear and mesh with each other may be provided.

Referring back to FIG. 25, the fixing portion 512 fixes the rotating portion 520 in a state in which the rotating portion 520 is rotatable, and in the present exemplary embodiment, the rotating portion 520 is formed in a shape corresponding to the shape of the fixing portion 512. Further, the fixing portion 512 fixes the corresponding rotating module to the fixing unit S such as other rotating modules, the main body, or the mount.

That is, the fixing portion 512 may serve to allow the rotating portions 520 of other rotating modules and the rotating portion 520 of the corresponding rotating module to operate independently.

Meanwhile, in the present exemplary embodiment, bearing accommodation spaces 523, which accommodate a bearing (not illustrated), are formed between the fixing portion 512 and the rotating portion 520. Therefore, it is possible to minimize rotational resistance of the fixing portion 512 and the rotating portion 520, and in this case, an anti-withdrawal plate 522, which prevents the withdrawal of the bearing, may be provided on the rotating portion 520.

FIG. 27 is a view illustrating a connection structure of the shoulder drive unit in the shoulder joint assembly of the robot arm according to the exemplary embodiment of the present invention.

As described above, in the case of the present exemplary embodiment, a total of three rotating modules are provided, and the first rotating module 510a, the second rotating module 510b, and the third rotating module 510c provide the degrees of rotation freedom based on the rotation axes in the different directions.

Specifically, the first rotating module 510a has a degree of rotation freedom based on a first axis in an x-direction, and the second rotating module 510b has a degree of rotation freedom based on a second axis in a y-direction perpendicular to the first axis. Further, the third rotating module 510c may have a degree of rotation freedom based on a third axis in a z-direction perpendicular to the first axis and the second axis.

Therefore, the shoulder drive unit of the present invention may freely implement a complicated motion of the shoulder.

Meanwhile, in the case of the present exemplary embodiment, the three rotating modules are provided, but the number of rotating modules may of course be increased or decreased in accordance with design.

The joint drive unit will be described below.

FIG. 28 is a view illustrating an appearance of the joint drive unit 550 in the shoulder joint assembly of the robot arm according to the exemplary embodiment of the present invention, and FIG. 29 is a view illustrating an appearance of a drive module 560 in the shoulder joint assembly of the robot arm according to the exemplary embodiment of the present invention.

As illustrated in FIGS. 28 and 29, the joint drive unit 550 includes a power transmission module 580 and the drive module 560.

The power transmission module 580 is a constituent element for transmitting driving power generated by the drive module 560 to the elbow joint or the wrist joint of the robot arm A, and the power transmission module 580 includes one or more wire winding members 590 around which wire parts W for transmitting power are wound and which wind or unwind the wire parts W while rotating.

Further, the drive module 560 includes wire actuators 564, each of which corresponds to the single wire winding member 590 and rotates the wire winding member 590. That is, the wire actuators 564 are provided so that the number of wire actuators 564 corresponds to the number of wire winding members 590, and provide driving power for rotating the wire actuators 564.

In the case of the present exemplary embodiment, a total of four wire actuators 564 and a total of four wire winding members 590 are provided, but the number of wire actuators 564 and the number of wire winding members 590 may be variously set.

Further, in the present exemplary embodiment, the drive module 560 includes driving power transmission pulleys 566 which have the same rotation axes as the wire actuators 564 and are rotated by the wire actuators 564, and the driving power transmission pulleys 566 may be connected to the wire winding members 590 through power transmission members (not illustrated).

In this case, the wire winding member 590 includes a winding portion 590b around which the wire part W is wound, and a cooperatively rotating portion 590a which is connected to the driving power transmission pulley 566 through the power transmission member.

Therefore, driving power generated by the wire actuators 564 may be transmitted to the respective joints through the driving power transmission pulleys 566, the power transmission members, the wire winding members 590, and the wire parts W.

Meanwhile, in the case of the present exemplary embodiment, the power transmission module 580 includes a support frame 582 which fixes the wire winding member 590 and the third rotating module 510c. In addition, the support frame 582 is connected to the upper arm portion of the robot arm A, and may rotate the robot arm A in accordance with the rotation of the rotating module.

Further, the drive module 560 includes a fixing frame 562 which is connected to the support frame 582. The fixing frame 562 is a constituent element which fixes the wire actuator 564, and enables the wire actuator 564 to change a separation distance from the wire winding member 590.

The power transmission member becomes slack due to a continuous use of the present invention, and thus power transmission efficiency may deteriorate, but in this case, the wire actuator 564 may compensate for the slack of the power transmission member by increasing the separation distance from the wire winding member 590.

FIG. 30 is a view illustrating a state in which the wire actuator 564 is moved in the shoulder joint assembly of the robot arm according to the exemplary embodiment of the present invention.

As illustrated in FIG. 30, in the present exemplary embodiment, a movement hole 563, which is elongated in a longitudinal direction, is formed at one side of the fixing frame 562, and the wire actuator 564 is fixed to the fixing frame 562 by a fastening member 568 that penetrates the movement hole 563.

Therefore, in a case in which the power transmission member becomes slack and thus power transmission is not smoothly performed as described above, it is possible to increase the separation distance from the wire winding member by releasing the fastened state of the fastening member 568, and moving the wire actuator 564 to an upper side of the movement hole, and then fastening the fastening member 568 again.

As described above, the advantage of the present invention is that performance does not deteriorate even though the robot arm is used over a long period of time.

Meanwhile, the method of moving the wire actuator 564 may be variously implemented in addition to the method of the present exemplary embodiment.

While the exemplary embodiments according to the present invention have been described above, it is obvious to those skilled in the art that the present invention may be specified in other particular forms in addition to the aforementioned exemplary embodiments without departing from the spirit or the scope of the present invention. Accordingly, it should be understood that the aforementioned exemplary embodiments are not restrictive but illustrative, and thus the present invention is not limited to the aforementioned description, and may be modified within the scope of the appended claims and the equivalent range thereto.

The invention claimed is:

1. A robot arm comprising:
a shoulder joint assembly which is connected to an upper arm portion, and includes a drive unit for generating driving power;
an elbow joint assembly which is provided between the upper arm portion and a forearm portion, and operates by being supplied with driving power from the drive unit; and
a wrist joint assembly which is provided between the forearm portion and a hand portion, and operates by being supplied with driving power from the drive unit,
wherein the elbow joint assembly includes,
a stationary member which is connected to the upper arm portion, and has a first curved surface portion formed as at least a part of a circumference of the stationary member is formed in an arc shape,
a rotating member which is connected to the forearm portion, has a second curved surface portion formed as at least a part of a circumference of the rotating member is formed in an arc shape being in contact with the first curved surface portion, and is rotated along the first curved surface portion,
at least a pair of first pulleys which is eccentrically provided at one side of the stationary member and one side of the rotating member based on a rotation center point with respect to the first curved surface portion and the second curved surface portion,
at least a pair of second pulleys which is eccentrically provided at the other side of the stationary member and the other side of the rotating member based on the rotation center point with respect to the first curved surface portion and the second curved surface portion,
a first wire part which is wound around the pair of first pulleys, and has one side extending toward the drive unit,
a second wire part which is wound around the pair of second pulleys, and has one side extending toward the drive unit,
a first connecting pulley and a second connecting pulley provided on a first portion of the stationary member and the rotating member, respectively,
a third connecting pulley and fourth connecting pulley provided on a second portion which is different from the first portion of the stationary member and the rotating member, respectively,
a third wire part which is wound around the first connecting pulley and the third connecting pulley, and
a fourth wire part which is wound around the second connecting pulley and the fourth connecting pulley.

2. The robot arm of claim 1, wherein the third wire part and the fourth wire part are wound around to be intersected between the stationary member and the rotating member.

3. The robot arm of claim 2, wherein the elbow joint assembly further includes a support bar which connects rotation center points with respect to the first curved surface portion and the second curved surface portion, and supports the stationary member and the rotating member.

4. The robot arm of claim 2, wherein the elbow joint assembly further includes a rotation assisting member which intersects at a contact point between the first curved surface portion and the second curved surface portion, is provided to surround both of the circumferences of the stationary member and the rotating member, and induces a rolling motion between the stationary member and the rotating member.

5. The robot arm of claim 4, wherein an insertion groove into which the rotation assisting member is inserted is formed at the circumferences of the stationary member and the rotating member.

* * * * *